United States Patent
Fujii et al.

(10) Patent No.: US 8,250,327 B2
(45) Date of Patent: Aug. 21, 2012

(54) STORAGE APPARATUS AND ITS CONTROL METHOD

(75) Inventors: Tetsuhiko Fujii, Odawara (JP); Masataka Innan, Odawara (JP); Tatsuya Yunoki, Funabashi (JP); Hideo Tabuchi, Odawara (JP)

(73) Assignee: Hitachi Ltd., Tokyo (JP)

( * ) Notice: Subject to any disclaimer, the term of this patent is extended or adjusted under 35 U.S.C. 154(b) by 507 days.

(21) Appl. No.: 12/310,816

(22) PCT Filed: Feb. 25, 2009

(86) PCT No.: PCT/JP2009/054005
§ 371 (c)(1),
(2), (4) Date: Mar. 9, 2009

(87) PCT Pub. No.: WO2010/097961
PCT Pub. Date: Sep. 2, 2010

(65) Prior Publication Data
US 2011/0185135 A1    Jul. 28, 2011

(51) Int. Cl.
*G06F 12/00* (2006.01)
(52) U.S. Cl. ...... 711/165; 711/170; 711/4; 711/E12.002
(58) Field of Classification Search .................. 711/170, 711/4, 112, 100
See application file for complete search history.

(56) References Cited

U.S. PATENT DOCUMENTS

| 2004/0254964 | A1* | 12/2004 | Kodama et al. | 707/204 |
|---|---|---|---|---|
| 2005/0091455 | A1 | 4/2005 | Kano et al. | |
| 2007/0192560 | A1* | 8/2007 | Furuhashi | 711/170 |
| 2008/0229048 | A1 | 9/2008 | Murasi et al. | |

FOREIGN PATENT DOCUMENTS

| EP | 1 903 428 A | 3/2007 |
|---|---|---|
| JP | 2003-015915 | 7/2001 |

OTHER PUBLICATIONS

International Search Report mailed Sep. 28, 2009.

* cited by examiner

*Primary Examiner* — Kevin Verbrugge
*Assistant Examiner* — Victor Wang
(74) *Attorney, Agent, or Firm* — Stites & Harbison, PLLC; Juan Carlos A. Marquez, Esq.

(57) ABSTRACT

In a storage apparatus and its control method including multiple first virtual volumes to be provided to a host system and multiple pools each having a memory capacity, and equipped with a function of dynamically allocating a storage area to the first virtual volumes from the pools associated with the first virtual volumes in accordance with the usage status of the first virtual volumes, the unused capacity in each of the pools is managed, and, when the unused capacity of one of the pools falls below a predetermined threshold value, a part of the unused capacity of the other pools is allocated to the one pool. It is thereby possible to realize a highly reliable storage apparatus and its control method.

10 Claims, 25 Drawing Sheets

| VOLUME NUMBER | VOLUME TYPE | POOL NUMBER |
|---|---|---|
| 0001 | NORMAL | - |
| 0002 | VIRTUAL | 01 |
| 0003 | VIRTUAL | 02 |
| 0004 | VIRTUAL | 01 |
| ⋮ | ⋮ | ⋮ |

| VOLUME NUMBER | VOLUME SIZE | POOL NUMBER |
|---|---|---|
| 0002 | 1024 | 01 |

| VOLUME INTERNAL PAGE NUMBER | ALLOCATED/ UNALLOCATED FLAG | POOL INTERNAL PAGE NUMBER |
|---|---|---|
| 0001 | 1 | 0002 |
| 0002 | 0 | – |
| 0003 | 1 | 0003 |
| ⋮ | ⋮ | ⋮ |

(B)

| VOLUME NUMBER | VOLUME SIZE | POOL NUMBER |
|---|---|---|
| 0004 | 2048 | 01 |

| VOLUME INTERNAL PAGE NUMBER | ALLOCATED/ UNALLOCATED FLAG | POOL INTERNAL PAGE NUMBER |
|---|---|---|
| 0001 | 1 | 0001 |
| 0002 | 1 | 0004 |
| 0003 | 0 | – |
| ⋮ | ⋮ | ⋮ |

| | 32AA | 32AB | 32AC | 32AD | |
|---|---|---|---|---|---|
| | POOL NUMBER | POOL TOTAL CAPACITY | POOL USAGE | POOL UNUSED CAPACITY | 32A |
| | 01 | 4096 | 4 | 4092 | |
| | PLVOL VOLUME NUMBER | MEMORY CAPACITY | | | |
| 32BA | 0002 | 180 | 32BB | | 32B |
| | 0005 | 128 | | | |
| | : | : | | | |
| | V VOL VOLUME NUMBER | MEMORY CAPACITY | | | |
| 32CA | 0002 | 3800 | 32BB | | 32C |
| | 0004 | 4720 | | | |
| | : | : | | | |

| | 33A | | 33B | | | | |
|---|---|---|---|---|---|---|---|
| | 33AA | 33AB | | | | | |
| | POOL NUMBER | POOL TOTAL CAPACITY | | | | | |
| | 01 | 4096 | | | | | |
| | POOL INTERNAL PAGE NUMBER | PLVOL VOLUME NUMBER | PLVOL INTERNAL PAGE NUMBER | ALLOCATED/ UNALLOCATED FLAG | VVOL VOLUME NUMBER | VVOL INTERNAL PAGE NUMBER | |
| | 0001 | 0001 | 0001 | 1 | 0004 | 0001 | |
| | 0002 | 0001 | 0002 | 1 | 0002 | 0001 | |
| | 0003 | 0001 | 0003 | 1 | 0002 | 0003 | |
| | 0004 | 0001 | 0004 | 1 | 0004 | 0002 | |
| | .. | .. | .. | .. | .. | .. | |
| | 33BA | 33BB | 33BC | 33BD | 33BE | 33BF | |

| TOTAL POOL COUNT | | | |
|---|---|---|---|
| 23 | | | |
| POOL NUMBER | POOL CAPACITY | POOL UNUSED CAPACITY | POOL ATTRIBUTE |
| 01 | 4096 | 4092 | SATA,RAID5,··· |
| 02 | 6820 | 4216 | SATA,RAID5,··· |
| 03 | 5240 | 3610 | SATA,RAID5,··· |
| : | : | : | : |

FIG.10

| COPY SOURCE VOLUME NUMBER (36AA) | COPY DESTINATION VOLUME NUMBER (36AB) |
|---|---|
| PAGE NUMBER (36BA) | COPIED/UNCOPIED FLAG (36BB) |
| 0001 | 0 |
| 0002 | 0 |
| ⋮ | ⋮ |

36A = header rows; 36B = data rows

FIG.15

| POLICY 1 | ONLY USE POOL HAVING SAME CHARACTERISTICS AS SELF-POOL |
|---|---|
| POLICY 2 | PRIORITY IS GIVEN TO POOL HAVING SAME CHARACTERISTICS AS SELF-POOL, BUT POOL OF ARBITRARY CHARACTERISTICS MAY ALSO BE USED |
| POLICY 3 | FOLLOW ALLOCATION POLICY DESIGNATED IN ADVANCE BY ADMINISTRATOR |

FIG.18

| POLICY 1 | RETURN UNCONDITIONALLY |
|---|---|
| POLICY 2 | LEAVE AS IS IF POOL CHARACTERISTICS ARE SAME, AND RETURN IF POOL CHARACTERISTICS ARE DIFFERENT |
| POLICY 3 | FOLLOW ADMINISTRATOR'S INSTRUCTIONS |
| POLICY 4 | DO NOT RETURN FOR TIME BEING, AND RETURN AT PREDETERMINED TIMING |
| POLICY 5 | CONTINUE USING UNCONDITIONALLY |

STORAGE APPARATUS AND ITS CONTROL METHOD

TECHNICAL FIELD

The present invention generally relates to a storage apparatus and its control method, and in particular can be suitably applied to a storage apparatus equipped with a dynamic provisioning function.

BACKGROUND ART

In recent years, the amount of user data stored by users in storage apparatuses is increasing rapidly pursuant to the development of the information society and, consequently, customer needs concerning the increase in capacity and improvement in efficiency of storage apparatuses are also growing from the perspective of cost reduction.

Under these circumstances, the dynamic provisioning function is being proposed in recent years as one function of the storage apparatus. The dynamic provisioning function is a function of presenting to a server a virtual logical volume (this is hereinafter referred to as the "virtual volume") as a logical volume (this is hereinafter referred to as the "logical volume") for reading and writing data, and dynamically allocating a storage area for actually storing data to the virtual volume according to the usage status of the presented virtual volume (refer to Japanese Patent Laid-Open Publication No. 2003-015915). According to this kind of dynamic provisioning function, there is an advantage in that the storage area in the storage apparatus can be used efficiently while presenting to the server a virtual volume having a capacity that is greater than the storage area in the storage apparatus.

With a storage apparatus equipped with this kind of dynamic provisioning function, a virtual volume to be presented to the server and a pool for allocating the actual storage area to the virtual volume are defined. When the storage apparatus receives a write request to the virtual volume from the server and a storage area is not allocated to the address position designated as the data write destination, it allocates an unused storage area in the pool to that address position, and writes data into the storage area. Meanwhile, when the server receives a read request for reading from the address position to which the storage area in the virtual volume has not been allocated, the storage apparatus sends "0" as read data to the server. The correspondence between the virtual volume and the actual storage area is managed with a management table.

A pool is configured from one or more logical volumes (these are hereinafter referred to as the "pool volumes") configured from a tangible storage area (this is hereinafter referred to as the "real storage area" as appropriate). Although a pool volume can be added to the pool even in operation, once a pool volume is set as the configuration volume of the pool, it is not possible to delete that pool volume from that pool. Thus, in order to reduce the capacity of the pool, it is necessary to recreate the pool. Meanwhile, if the unused capacity of the pool runs short, it will not be possible to write data into an area to which the storage area in the virtual volume has not yet been allocated.

Incidentally, the dynamic provisioning function that is currently being provided by the Applicant does not allow a logical volume in a storage apparatus equipped with the dynamic provisioning function and a logical volume provided by another storage apparatus to the foregoing storage apparatus to be set as the configuration volume of the same pool. In addition, the dynamic provisioning function provided by the Applicant recommends unifying the characteristics of the pool volumes configuring the same pool in consideration of performance.

DISCLOSURE OF THE INVENTION

Meanwhile, with the foregoing dynamic provisioning function, if the real used capacity of the virtual volume increases and the unused capacity of the pool associated with the virtual volume becomes depleted, a real storage area can no longer be allocated to the virtual volume. Thus, even if a write request is subsequently given from the server, a situation will arise where it will not be possible to write the write data into the virtual volume (in reality the real storage area).

This kind of situation may occur in configurations where a plurality of virtual volumes are associated with the same pool or in cases of making transactions or recording journals in a system used by numerous users or a system that performs online transactions and purchase and sale of products.

The present invention was made in view of the foregoing points. Thus, an object of the present invention is to propose a highly reliable storage apparatus and its control method capable of preventing the occurrence of the foregoing situation.

In order to achieve the foregoing object, the present invention provides a storage apparatus including a plurality of first virtual volumes to be provided to a host system and a plurality of pools each having a memory capacity, and equipped with a function of dynamically allocating a storage area to the first virtual volumes from the pools associated with the first virtual volumes in accordance with the usage status of the first virtual volumes. This storage apparatus comprises a pool unused capacity management unit for managing the unused capacity in each of the pools, and a capacity allocation unit for allocating, when the unused capacity of one of the pools falls below a predetermined threshold value, a part of the unused capacity of the other pools to the one pool.

The present invention additionally provides a control method of a storage apparatus including a plurality of first virtual volumes to be provided to a host system and a plurality of pools each having a memory capacity, and equipped with a function of dynamically allocating a storage area to the first virtual volumes from the pools associated with the first virtual volumes in accordance with the usage status of the first virtual volumes. This control method comprises a first step of managing the unused capacity in each of the pools, and a second step of allocating, when the unused capacity of one of the pools falls below a predetermined threshold value, a part of the unused capacity of the other pools to the one pool.

Thus, according to the storage apparatus and its control method of the present invention, since the capacity from other pools is allocated to a pool when the unused capacity of such pool falls below a threshold value, it is possible to prevent the occurrence of a situation where write data from the host system cannot be written as a result of the unused capacity of the pool running short or becoming depleted. Consequently, it is possible to realize a highly reliable storage apparatus and its control method.

BRIEF DESCRIPTION OF THE DRAWINGS

FIG. 5A is a conceptual diagram showing the configuration of a virtual volume mapping table;

FIG. 7 is a conceptual diagram showing the configuration of a pool real storage area mapping table;

FIG. 8 is a conceptual diagram showing the configuration of a pool list;

FIG. 10 is a conceptual diagram showing the configuration of a copy status management table;

FIG. 15 is a chart showing allocation policy examples;

FIG. 18 is a chart showing capacity return requirement policy examples;

BEST MODE FOR CARRYING OUT THE INVENTION

An embodiment of the present invention is now explained in detail with reference to the attached drawings.

(1) Configuration of Computer System in Present Embodiment

Figure 1:
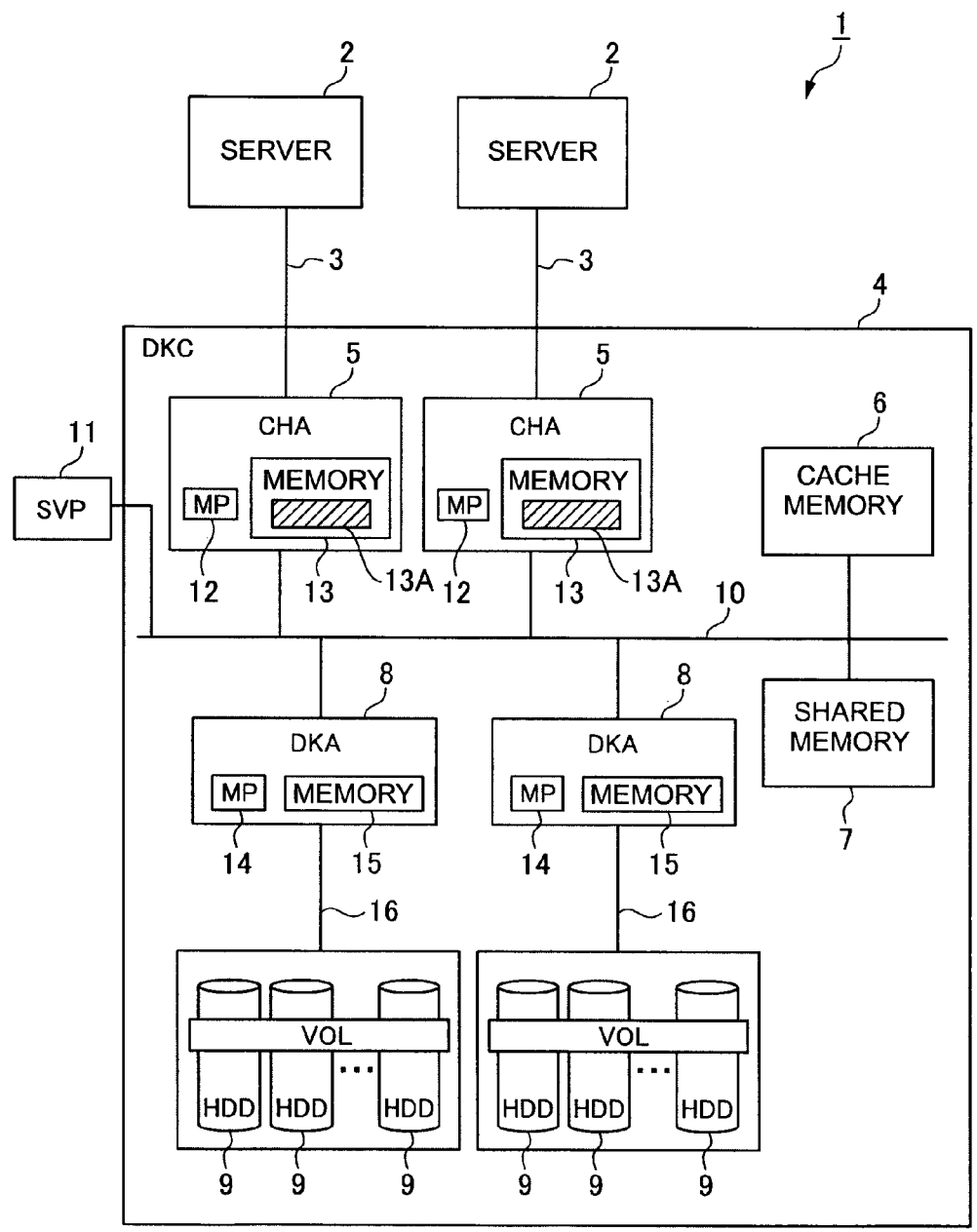
FIG. 1 is a block diagram showing the configuration of a computer system according to an embodiment of the present invention.

FIG. 1 shows the overall computer system 1 according to this embodiment. The computer system 1 is configured by one or more servers 2 as host systems being connected to a storage apparatus 4 via a host interface cable 3.

The server 2 is a computer device comprising information processing resources such as a CPU (Central Processing Unit) and a memory, and is configured, for instance, from a personal computer, a workstation or a mainframe. The server 2 comprises information input devices (not shown) such as a keyboard, a switch, a pointing device and a microphone, and information output devices (not shown) such as a monitor and a speaker.

The storage apparatus 4 comprises a plurality of channel adapters 5, a cache memory 6, a shared memory 7, a plurality of disk adapters 8, and a plurality of hard disk devices 9. Among the foregoing components, the channel adapters 5, the cache memory 6, the shared memory 7 and the disk adapters 8 are mutually connected via an internal bus 10 in a freely communicable manner. The internal bus 10 is also connected to a management terminal (SVP: Service Processor) 11.

The channel adapters 5 are respectively configured as a microcomputer system comprising a microprocessor 12, a memory 13 and the like, and function as a communication interface with the server 2 connected to the self-storage apparatus 4. The microprocessor 12 is a processor that governs the overall operational control of the channel adapters 5, and, by executing a microprogram 13A stored in the memory 13, the microprocessor 12 causes the channel adapters 5 to execute, as a whole, prescribed control processing.

The cache memory 6 is a storage memory to be shared by the channel adapters 5 and the disk adapters 8. The cache memory 6 is primarily used for temporarily storing the data to be input into and output from the hard disk devices 9.

The shared memory 7 is a storage memory to be shared by the channel adapters 5 and the disk adapters 8. The shared memory 7 stores information such as the configuration information of the respective storage apparatuses 9. The volume management table 30 (FIG. 4A), the virtual volume mapping table 31 (FIG. 5A), the pool management table 32 (FIG. 6), the pool real storage area mapping table 33 (FIG. 7), the pool list 34 (FIG. 8), the pool configuration volume management table 35 (FIG. 9) and the copy status management table 36 (FIG. 10) described later are also stored in the shared memory 7.

The disk adapters 8 are respectively configured as a microcomputer system comprising a microprocessor 14, a memory 15 and the like, and functions as an interface for controlling the protocol when communicating with the hard disk devices 9. The disk adapters 8 are respectively connected to a plurality of hard disk devices 9 via a drive interface cable 16, and send and receive data to and from the corresponding hard disk device 9 according to the request from the server 2.

The hard disk devices 9 are configured, for instance, from expensive disks such as FC (Fibre channel) disks or inexpensive disks such as SATA (Serial AT Attachment) disks. One or more logical volumes VOL are created in a storage area provided by one or more hard disk devices 9. Data is stored in the logical volume VOL in block (this is hereinafter referred to as the "logical block") units of blocks of a prescribed size.

Each logical volume VOL is given a unique identifier (this is hereinafter referred to as the "volume number" or "LDEV number"). In the case of this embodiment, the input and output of data is performed by combining the volume number and a number (LBA: Logical Block Address) that is given and unique to each logical block as the address, and designating that address.

In the case of this embodiment, as the types of logical volumes VOL to be set in the storage apparatus 4, there is a normal logical volume VOL (this is hereinafter referred to as the "real volume" as appropriate) which actually has a memory capacity and is defined in a storage area provided by the hard disk device 9, a virtual volume which does not have a memory capacity from a practical standpoint, and so on.

The management terminal 11 is used for the maintenance management of the storage apparatus 4, and is configured, for instance, from a notebook personal computer. The management terminal 11 is used for collecting necessary information from the channel adapters 5 and the disk adapters 8 via the internal bus 10 and displaying such information, and displaying various screens (refer to FIG. 22 to FIG. 25) described later according to the administrator's operations.

(2) Pool Unused Capacity Management Function

The pool unused capacity management function of this embodiment that is loaded in the storage apparatus 4 is now explained. The storage apparatus 4 is equipped with a pool unused capacity management function for monitoring the unused capacity of the respective pools and lending and borrowing capacity among the pools as needed in addition to the normal dynamic provisioning function for dynamically allocating a storage area to a virtual volume according to the usage status of such virtual volume.

Figure 2:
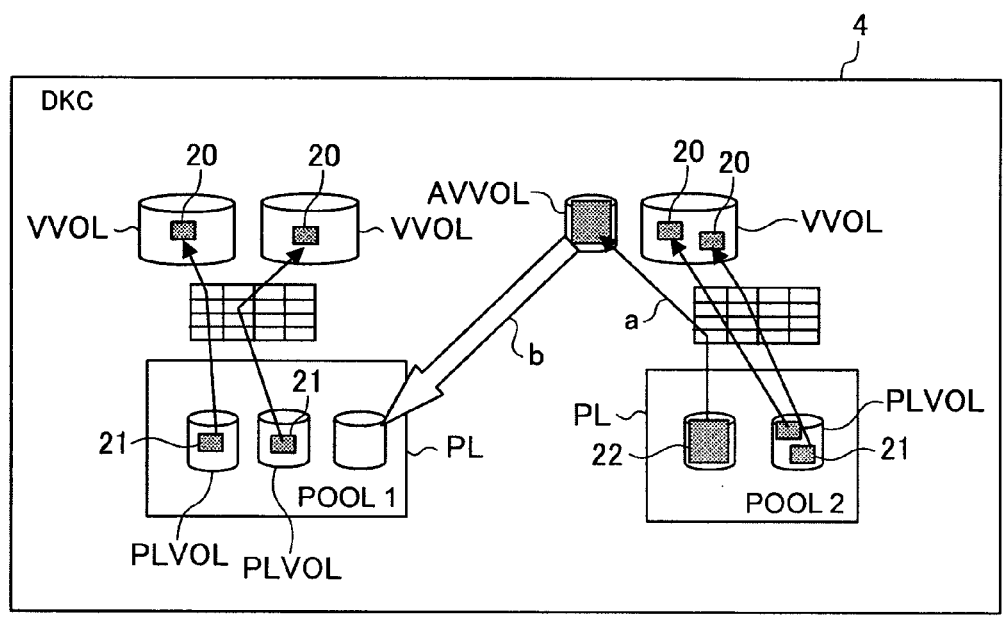
FIG. 2 is a conceptual diagram schematically explaining the pool unused capacity management function loaded in a storage apparatus according to the present embodiment.

Specifically, each channel adapter 5 of the storage apparatus 4, as shown in FIG. 2, is providing a virtual volume VVOL to the server 2 based on the dynamic provisioning function. In a case where a data write request for writing data into the virtual volume VVOL is given from the server 2 and a storage area 21 has not been allocated to an area 20 of the data write destination, the channel adapter 5 allocates the storage area 21 to the area 20 of the data write destination of the virtual volume VVOL from the pool PL associated with that virtual volume VVOL, and stores write data in the allocated storage area 21.

Incidentally, the allocation of the foregoing storage area 21 is performed in units of a size referred to as a page that is configured from a plurality of logical blocks. The channel adapter 5 manages the correspondence of the area 20 in the virtual volume VVOL and the real storage area 21 allocated to the area 20 using a virtual volume mapping table 31 described later with reference to FIG. 5A. A pool PL is normally configured from one or more pool volumes PLVOL. FIG. 2 shows that in the initial status the "pool 1" is configured from two pool volumes PLVOL and the "pool 2" is configured from one pool volume PLVOL.

Meanwhile, the channel adapter 5 is monitoring the unused capacity of the respective pools PL, and creates a virtual volume VVOL (this is hereinafter referred to as the "capacity allocation virtual volume AVVOL") if the unused capacity of any pool PL ("pool 1" in this case) runs short, and allocates the storage area 22 of a pool PL ("pool 2" in this case) with sufficient unused capacity to the capacity allocation virtual volume AVVOL (arrow a). The channel adapter 5 thereafter sets the capacity allocation virtual volume AVVOL as the configuration volume of the "pool 1."

Figure 3:
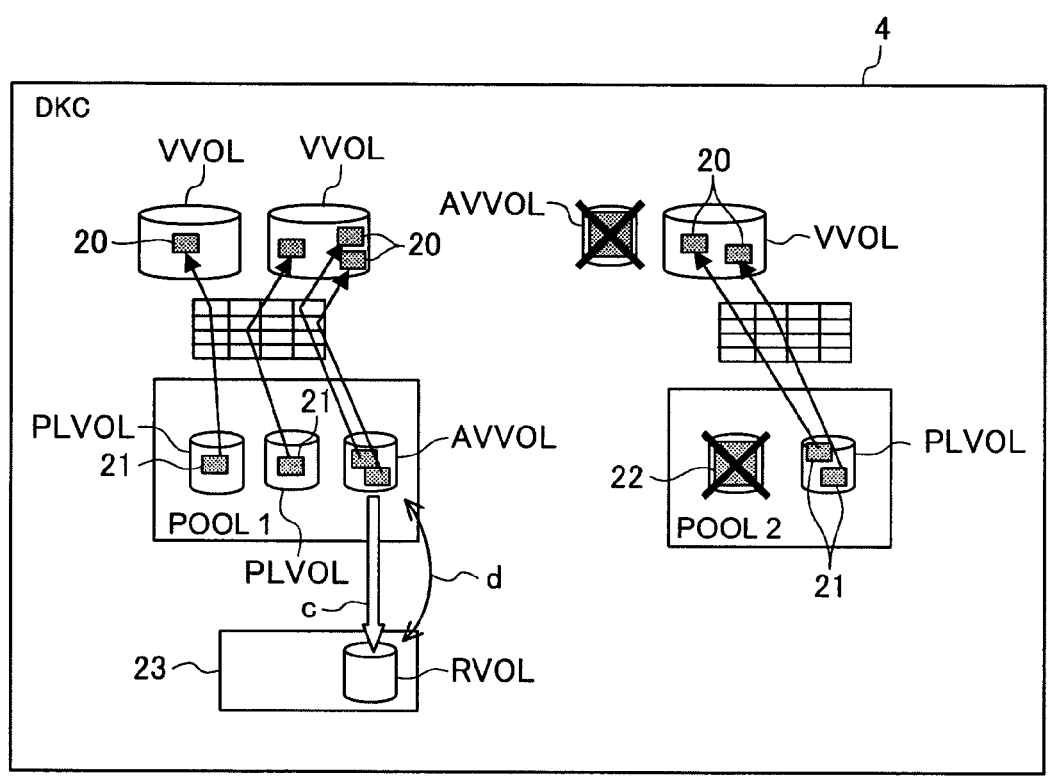
FIG. 3 is a conceptual diagram schematically explaining the pool unused capacity management function loaded in a storage apparatus according to the present embodiment.

When a hard disk device 9 is subsequently added on, the channel adapter 5, as shown in FIG. 3, sets a logical volume VOL (this is hereinafter referred to as the "capacity return volume RVOL"), which has a memory capacity in the amount of capacity that was allocated from the pool 2 to the pool 1, in the storage area 23 provided by the hard disk device 9, and copies the data stored in the capacity allocation virtual volume AVVOL of the "pool 1" (to be precise, data stored in the storage area 22 allocated to the capacity allocation virtual volume AVVOL in the "pool 2") to the capacity return volume RVOL (arrow c).

Subsequently, the channel adapter 5 switches the capacity allocation virtual volume AVVOL configuring the "pool 1" and the capacity return volume RVOL (arrow d), and thereafter deletes the capacity allocation virtual volume AVVOL and initializes the storage area that was allocated to the capacity allocation virtual volume AVVOL in the "pool 2."

As means for realizing the foregoing dynamic provisioning function and the pool unused capacity management function, the shared memory 7 of the storage apparatus 4 stores a volume management table 30, a virtual volume mapping table 31, a pool management table 32, a pool real storage area mapping table 33, a pool list 34, a pool volume management table 35 and a copy status management table 36 as shown in FIG. 4A to FIG. 10.

Figures 4A, 4B:
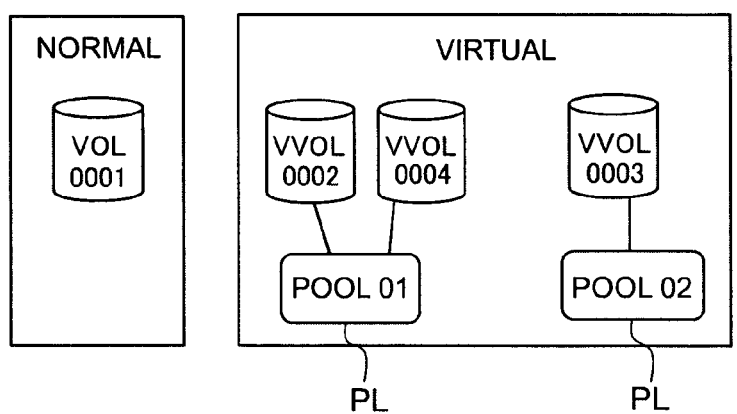
FIG. 4A is a conceptual diagram showing the configuration of a volume management table.
FIG. 4B is a conceptual diagram explaining the volume management table.

The volume management table 30 is a table for managing the logical volumes (normal volume and virtual volume) defined in the storage apparatus 4 and is configured, as shown in FIG. 4A, from a volume number column 30A, a volume type column 30B and a pool number column 30C.

Among the above, the volume number column 30A stores a unique volume number given to the corresponding logical volume, and the volume type column 30B stores the type ("normal" or "virtual") of that logical volume. If the type of that logical volume is "virtual," the pool number column 30C stores the pool number of the pool PL associated with that logical volume. In the dynamic provisioning function, a storage area to be allocated to the virtual volume is limited to a storage area in a pool PL that is associated with the virtual volume in advance.

Accordingly, in the case of FIG. 4A, as shown in FIG. 4B, it can be understood that the logical volume VOL having the volume number of "0001" is a normal volume, and the logical volumes VOL having the volume numbers of "0002," "0003" and "0004" are virtual volumes VVOL. And, among the above, it can be understood that the logical volumes VOL (virtual volumes VVOL) having the volume numbers of "0002" and "0003" are associated with the pool PL having a pool number of "01," and the logical volume VOL (virtual volume VVOL) having the volume number of "0003" is associated with the pool PL having the pool number of "02."

The virtual volume mapping table 31 is a table for managing with which page (this is hereinafter referred to as the "pool internal page") of which pool PL the page (this is hereinafter referred to as the "volume internal page") in the virtual volume provided to the server 2 is associated, and is created for each virtual volume. The virtual volume mapping table 31 is configured, as shown in FIG. 5A, from a header portion 31A and a mapping portion 31B. The header portion 31A is configured from a volume number column 31AA, a volume size column 31AB and a pool number column 31AC, and the mapping portion 31B is configured from a page number column 31BA, an allocated/unallocated flag column 31BB and a pool internal page number column 31BC.

Among the above, the volume number column 31AA, the volume size column 31AB and the pool number column 31AC of the header portion 31A respectively store the volume number and volume size (total number of pages) of the corresponding virtual volume, and the pool number of the corresponding pool. The page number column 31BA, the allocated/unallocated flag column 31BB and the pool internal page number column 31BC of the mapping portion 31B respectively store the page number (this is hereinafter referred to as the "volume internal page number") given to each volume internal page in the virtual volume, a flag (this is hereinafter referred to as the "allocated/unallocated flag") representing whether a pool internal page has been allocated to that volume internal page, and the page number (this is hereinafter referred to as the "pool internal page number") of the pool internal page in the pool.

Figure 5B:
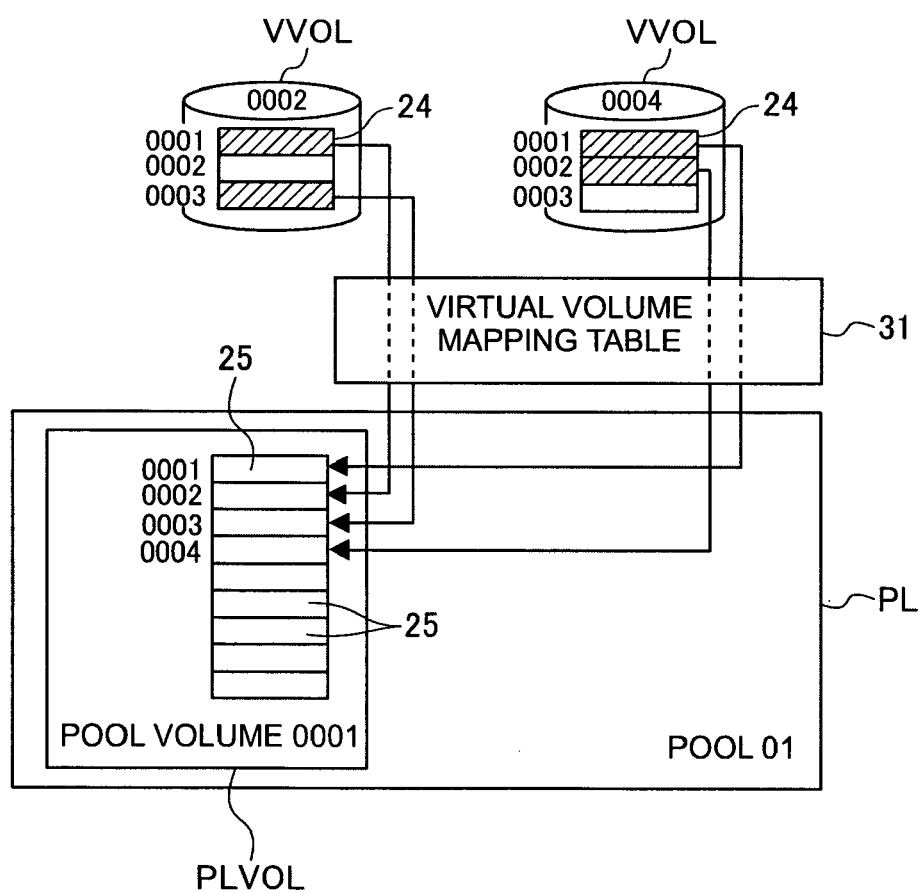
FIG. 5B is a conceptual diagram explaining the virtual volume mapping table.

Accordingly, in the case of FIG. 5A (A), as shown in FIG. 5B, it can be understood that the pool internal pages 25 having the pool internal page number of "0002" or "0003" in the pool PL having the pool number of "01" are allocated respectively to the volume internal pages 24 having the volume internal page numbers of "0001" and "0003" in the virtual volume VVOL having the volume number of "0002," and a pool internal page 25 has not yet been allocated to the volume internal page 24 in which the page number of the virtual volume VVOL is "0002." In the case of FIG. 5A (B), it can be understood that the pool internal pages 25 having the pool internal page number of "0001" or "0004" in the pool PL having the pool number of "01" are allocated respectively to the volume internal pages 24 having the page numbers of "0001" and "0002" in the virtual volume VVOL having the volume number of "0004."

Figures 6A, 6B:
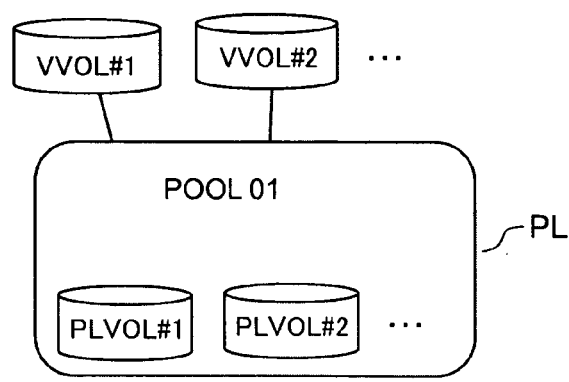
FIG. 6A is a conceptual diagram showing the configuration of a pool management table.
FIG. 6B is a conceptual diagram explaining the pool management table.

The pool management table 32 is a table for managing the pools in the storage apparatus 4, and is created for each pool. The pool management table 32 is configured, as shown in FIG. 6A, from a header portion 32A, a pool configuration LDEV list portion 32B and a virtual volume list portion 32C.

The header portion 32A is configured from a pool number column 32AA, a pool total capacity column 32AB, a pool usage column 32AC and a pool unused capacity column 32AD. The pool number column 32AA, the pool total capacity column 32AB, the pool usage column 32AC and the pool unused capacity column 32AD respectively store the pool number of the corresponding pool, the total capacity (total number of pages) of that pool, the current used capacity (total number of used pages) of that pool, and the current unused capacity (total number of unused pages) of that pool.

The pool configuration LDEV list portion 32B is a list for managing the pool volumes configuring that pool, and is configured from a PLVOL volume number column 32BA and a memory capacity column 32BB. The PLVOL volume number column 32BA and the memory capacity column 32BB respectively store the volume number and memory capacity of the respective pool volumes configuring that pool.

The virtual volume list portion 32C is a list for managing the virtual volumes associated with that pool, and is configured from a VVOL volume number column 32CA and a memory capacity column 32CB. The VVOL volume number column 32CA and the memory capacity column 32CB respectively store the volume number of the virtual volumes associated with that pool and the capacity of such virtual volumes.

Accordingly, in the case of FIG. 6A, it can be understood that the total capacity of the pool having the pool number of "0001" is "4096" pages, the current unused capacity of the pool is "4" pages, and the unused capacity is "4092" pages. Moreover, as shown in FIG. 6B, this pool PL is configured from the pool volumes respectively having the memory capacity of "180" pages, "128" pages, . . . respectively given the volume numbers of "0002," "0005," . . . , and the virtual volumes VVOL respectively having the memory capacity of "3800" pages, "4720" pages, . . . respectively given the volume numbers of "0002," "0004," . . . are associated with this pool PL.

Meanwhile, the pool real storage area mapping table 33 is a table for managing the correspondence of the pool internal page of the corresponding pool and the volume internal page of the virtual volume associated with that pool. The pool real storage area mapping table 33 is configured, as shown in FIG. 7, from a header portion 33A and a mapping portion 33B.

Among the above, the header portion 33A is configured from a pool number column 33AA and a pool total capacity column 33AB. The pool number column 33AA and the pool total capacity column 33AB respectively store the pool number and the total capacity (total number of pages) of the corresponding pool.

The mapping portion 33B is configured from a pool internal page number column 33BA, a PLVOL volume number column 33BB, a PLVOL internal page number column 33BC, an allocated/unallocated flag column 33BD, a VVOL volume number column 33BE and a VVOL internal page number column 33BF. The pool internal page number column 33BA stores the page numbers of all pool internal pages existing in the corresponding pool, and the PLVOL volume number column 33BB and the PLVOL internal page number column 33BC respectively store the volume number of the pool volume providing the corresponding pool internal page, and the volume internal page number of the corresponding volume internal page in the pool volume.

The allocated/unallocated flag column 33BD stores the allocated/unallocated flag representing whether a virtual volume has already been allocated to the corresponding pool internal page, and the VVOL volume number column 33BE and the VVOL internal page number column 33BF respectively store the volume number of the virtual volume associated with the corresponding pool internal page, and the page number of the volume internal page to which the pool internal page in the virtual volume was allocated.

Accordingly, in the example of FIG. 7, as shown in FIG. 5B, the pool internal page 25 having the pool internal page number of, for instance, "0003" in the pool PL having the pool number of "01" is associated with the volume internal page having the volume internal page number of "0003" in the pool volume PLVOL given the volume number of "0001," and this pool internal page 25 is allocated to the volume internal page 24 having the volume internal page number of "0003" in the virtual volume VVOL given the volume number of "0002" (allocated/unallocated flag is "1").

Meanwhile, the pool list 34 is a table for managing all pools in the storage apparatus 4 and is configured, as shown in FIG. 8, from a header portion 34A and a pool list portion 34B. The header portion 34A is configured from a total pool count column 34AA, and the total pool count column 34AA stores the total number of pools existing in that storage apparatus 4.

The pool list portion 34B is configured from a pool number column 34BA, a pool capacity column 34BB, a pool unused capacity column 34BC and a pool characteristics column 34BD. The pool number column 34BA, the pool capacity column 34BB, the pool unused capacity column 34BC and the pool characteristics column 34BD respectively store the pool number of each pool existing in that storage apparatus 4, the pool total capacity (total number of pages) of that pool, the current unused capacity (total number of unused pages) of that pool, and the pool characteristics of that pool. Incidentally, as the pool characteristics to be stored in the pool characteristics column 34BD, there are the type of the hard disk devices 9 providing the storage area of that pool, the RAID (Redundant Arrays of Inexpensive Disks) level of that pool, and so on.

Accordingly, in the case of FIG. 8, it can be understood that the pool having the pool number of "02" has a pool capacity of "6820" pages and a current unused capacity of "4216" pages. And as the characteristics of this pool, FIG. 8 shows that the type of the hard disk devices 9 configuring the pool is "SATA" and the RAID level of the pool is "RAID 5," and so on.

Figure 9:
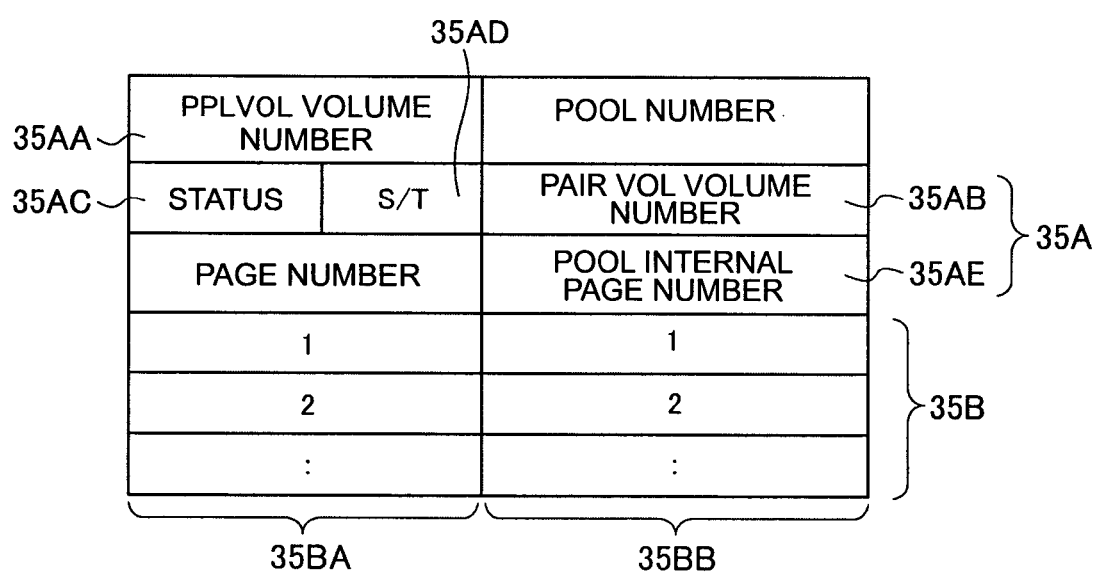
FIG. 9 is a conceptual diagram showing the configuration of a pool volume management table.

The pool volume management table 35 is a table for managing the pool volumes in the storage apparatus 4, and is created for each pool volume. The pool volume management table 35 is configured, as shown in FIG. 9, from a header portion 35A and a page list portion 35B.

The header portion 35A is configured from a PLVOL volume number column 35AA, a pool number column 35AB, a status column 35AC, a copy source/copy destination column 35AD and a pair VOL volume number column 35AE. The PVOL volume number column 35AA stores the volume number of that pool volume, and the pool number column 35AB stores the pool number of the pool configured by the pool volumes. The status column 35AC stores a status flag representing whether that pool volume is currently being copied, and the copy source/copy destination column 35AD stores an S/T flag representing whether the pool volume is a copy source or a copy destination in cases where such pool volume is being copied. The pair VOL volume number column 35AE stores the volume number of the logical volume of the other end in cases where such pool volume is being copied.

Meanwhile, the copy status management table 36 is a table for managing the copy status upon performing data copy between the capacity allocation virtual volume AVVOL and the capacity return volume RVOL as described above with reference to FIG. 3, and is created for each copy pair. Incidentally, a copy pair refers to the pair of logical volumes at the copy source and the copy destination that are set as a pair for performing data copy. The copy status management table 36 is configured, as shown in FIG. 10, from a header portion 36A and a copy status list portion 36B.

The header portion 36A is configured from a copy source volume number column 36AA and a copy destination volume number column 36AB. The copy source volume number column 36AA stores the volume number of the copy source logical volume (capacity allocation virtual volume) in the corresponding copy pair, and the copy destination volume number column 36AB stores the volume number of the copy destination logical volume in the copy pair.

The copy status list portion 36B is configured from a page number column 36BA and a copied/uncopied flag column 36BB. The page number column 36BA stores the volume internal page number of each volume internal page in the copy source logical volume, and the copied/uncopied flag column 36BB stores the copied/uncopied flag representing whether the copying of that volume internal page is complete. Incidentally, the default value of the copied/uncopied flag is "0" which represents that copying is not being performed.

(3) Processing by Channel Adapter
(3-1) Processing by Channel Adapter in Dynamic Provisioning Function The processing contents of the channel adapter concerning the dynamic provisioning function and the pool unused capacity monitoring function are now explained. The specific processing contents of the channel adapter 5 concerning the dynamic provisioning function are foremost explained. The following read processing and write processing are executed by the corresponding channel adapter 5 according to a microprogram 13A (FIG. 1) stored in the memory 13 (FIG. 1) of that channel adapter 5.

(3-1-1) Read Processing

Figure 11:
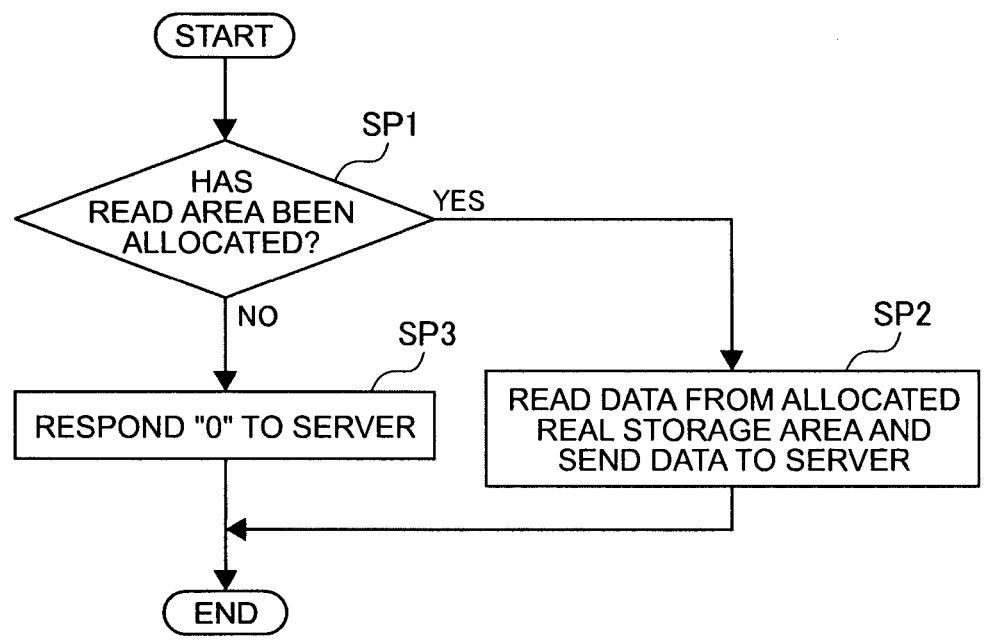
FIG. 11 is a flowchart showing the processing routine of read processing based on the dynamic provisioning function.

FIG. 11 shows the processing routine to be executed by the channel adapter 5 upon receiving a read request from the server 2 for reading data from the virtual volume.

Here, the channel adapter 5 seeks the volume internal page number of the volume internal page contained in the block address designated as the read destination in the read request among the volume internal pages in the virtual volume designated as the read destination in the read request. The pool internal page number can be obtained by dividing the block address designated as the read destination in the read request by the page size (number of blocks per page). The channel adapter 5 subsequently refers to the virtual volume mapping table 31 (FIG. 5A) of the virtual volume designated as the read destination in the read request, and determines whether a real storage area has been allocated to the volume internal page of the volume internal page number sought as described above (step SP1).

If the channel adapter 5 obtains a positive result in this determination, channel adapter 5 searches for the real storage area in the pool real storage area mapping table 33, and controls the corresponding disk adapter 8 (FIG. 1) and causes it to read data from the real storage area. The channel adapter 5 sends the obtained read data to the server 2 (step SP2), and thereafter ends the read processing.

Meanwhile, if the channel adapter 5 obtains a negative result in the determination at step SP1, it sends "0" to the server 2 (step SP3), and thereafter ends the read processing.

(3-1-2) Write Processing

Figure 12:
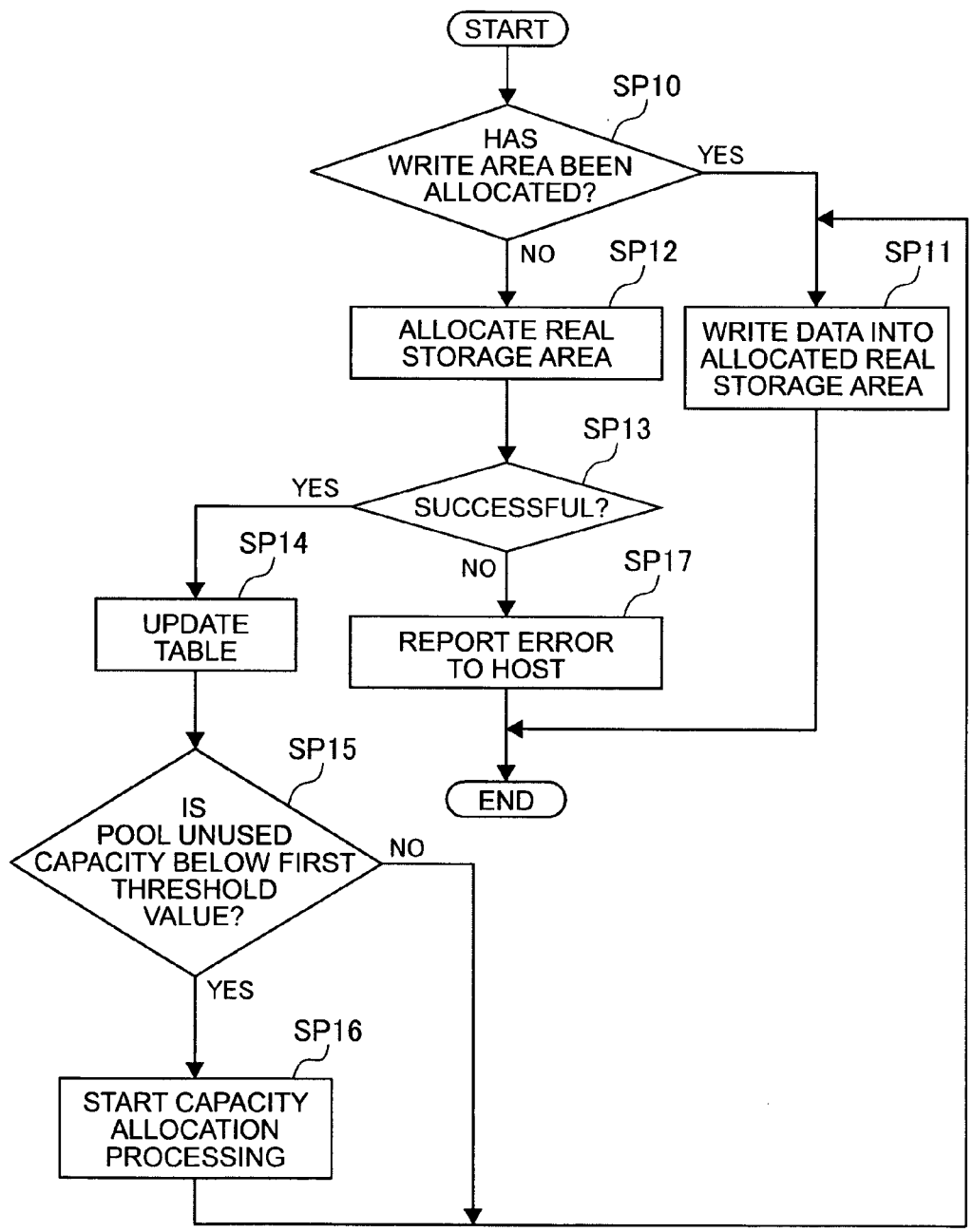
FIG. 12 is a flowchart showing the processing routine of write processing based on the dynamic provisioning function.

FIG. 12 shows the processing routine of the write processing to be executed by the channel adapter 5 upon receiving a write request and write data from the server 2.

Here, as with the case of receiving a read request, the channel adapter 5 seeks the volume internal page number of the volume internal page contained in the block address designated as the write destination in the write request among the volume internal pages in the virtual volume designated as the write destination in the write request. The channel adapter 5 subsequently refers to the virtual volume mapping table 31 (FIG. 5A) of the virtual volume designated as the write destination in the write request, and determines whether a real storage area has been allocated to the volume internal page of the volume internal page number sought as described above (step SP10).

If the channel adapter 5 obtains a positive result in this determination, the channel adapter 5 searches for the real storage area in the pool real storage area mapping table 33, and controls the corresponding disk adapter 8 (FIG. 1) and causes it to write the write data into the real storage area (step SP11). The channel adapter 5 thereafter ends the write processing.

Meanwhile, if the channel adapter 5 obtains a negative result in the determination at step SP10, it allocates, in page units, a real storage area to an area to which the write data in the virtual volume designated as the write destination in the write request is to be written (step SP12).

Specifically, the channel adapter 5 refers to the pool number column 31AC (FIG. 5A) of the virtual volume mapping table 31, and searches for the pool number of the pool associated with the virtual volume designated as the write designation in the write request. Moreover, the channel adapter 5 refers to the pool real storage area mapping table 33 (FIG. 7) of the pool given the pool number that was detected in the search, and searches for the pool internal page that has not yet been allocated to the virtual volume among the pool internal pages of that pool. The channel adapter 5 thereafter allocates the pool internal page that was detected in the search to the area in which the write data in the virtual volume designated as the write destination in the write request is to be written.

Subsequently, the channel adapter 5 determines whether the allocation processing of the real storage area to the foregoing virtual volume was successful (step SP13). If the channel adapter 5 obtains a positive result in this determination, it updates the relevant portions of the corresponding virtual volume mapping table 31 (FIG. 5A), pool management table 32 (FIG. 6A), pool real storage area mapping table 33 (FIG. 7) and pool list 34 (FIG. 8) (step SP14).

Subsequently, the channel adapter 5 determines whether the unused capacity of the pool that allocated the real storage area to the virtual volume at step SP12 fell below a predetermined threshold value (this is hereinafter referred to as the "first threshold value") (step SP15). Incidentally, as the first threshold value, used may be, for instance, a constant rate of the total capacity of the pool or a predetermined fixed value.

If the channel adapter 5 obtains a negative result in this determination, it proceeds to step SP11. Meanwhile, if the channel adapter 5 obtains a positive result in the determination at step SP15, it starts the capacity allocation processing of allocating a part of the unused capacity of a separate pool with sufficient unused capacity to the target pool (step SP16), and thereafter proceeds to step SP11. The channel adapter 5 thereafter executes the processing explained above with reference to step SP11, and then ends the write processing.

If the channel adapter 5 obtains a negative result in the determination at step SP13, it sends an error report to the server 2 (step SP17), and thereafter ends the write processing.

(3-2) Processing by Channel Adapter in Pool Unused Capacity Management Function

The specific processing contents of the channel adapter 5 concerning the pool unused capacity management function are now explained. The various processing routines explained below are also executed by the corresponding channel adapter 5 according to a microprogram 13A (FIG. 1) stored in the memory 13 (FIG. 1) of the channel adapter 5.

(3-2-1) Capacity Allocation Processing

Figure 13:
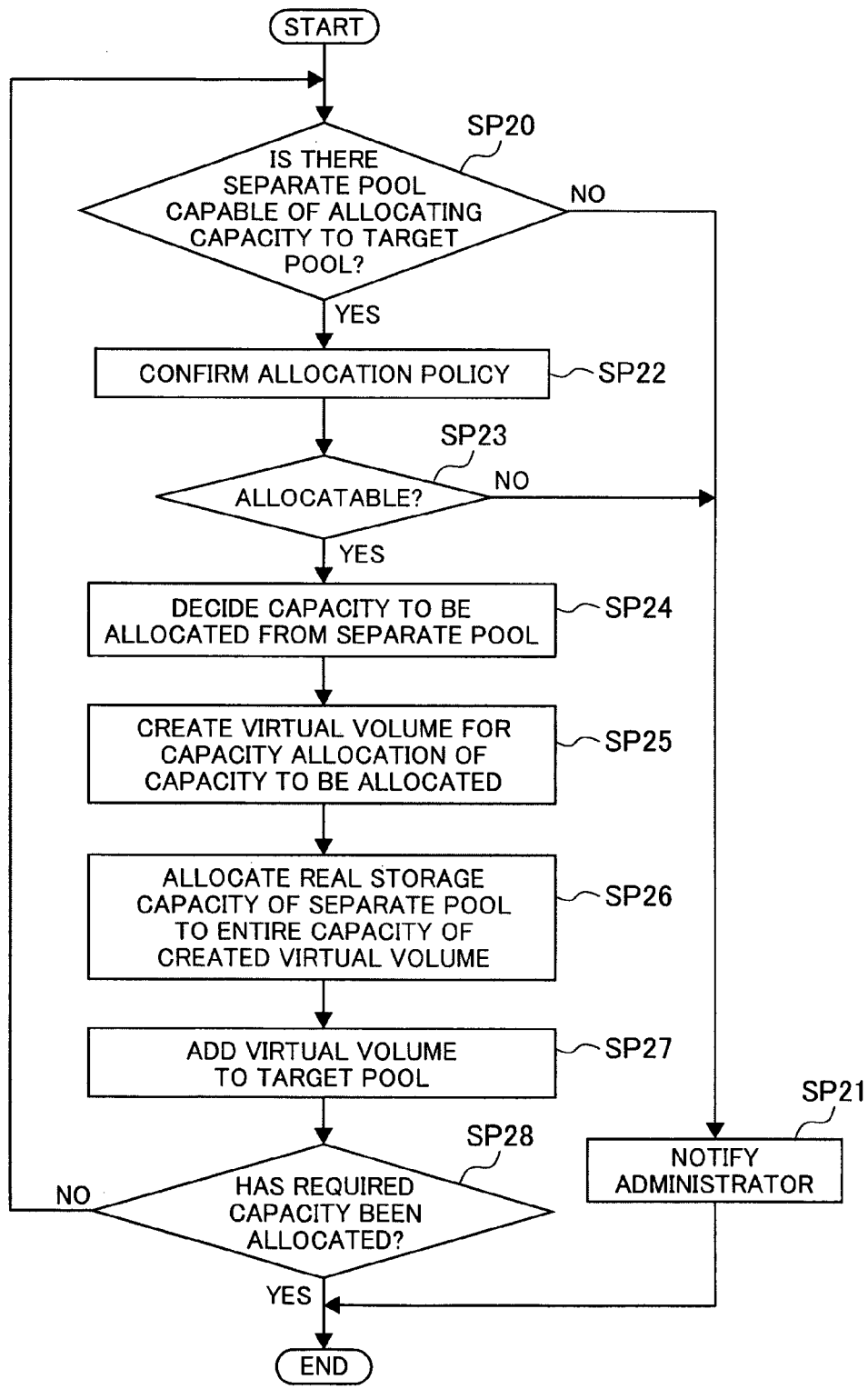
FIG. 13 is a flowchart showing the processing routine of capacity allocation processing.

FIG. 13 shows the processing routine of the capacity allocation processing to be started by the channel adapter 5 at step SP16 of the write processing explained above with reference to FIG. 12.

The channel adapter 5 starts the capacity allocation processing upon proceeding to step SP16 of the write processing, and foremost refers to the pool list 34 (FIG. 8) and determines whether there is a separate pool (this is hereinafter referred to as the "separate pool") that is separate from the target pool (this is hereinafter referred to as the "target pool") in the storage apparatus 4 that is targeted at such time, which has sufficient unused capacity, and which can allocate capacity to the target pool (step SP20).

Figure 14:
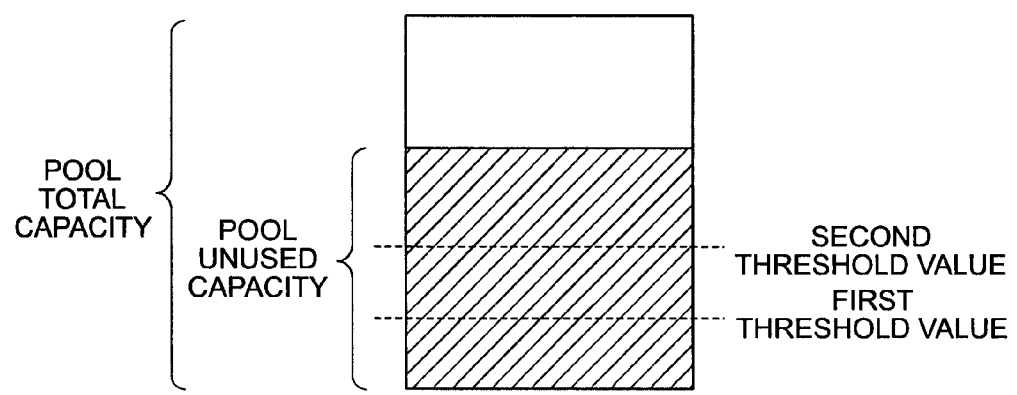
FIG. 14 is a conceptual diagram explaining the first and second threshold values.

Specifically, the channel adapter 5 determines, at step SP20, whether there is a separate pool in which the unused capacity is greater than the predetermined second threshold value. The second threshold value, as shown in FIG. 14, is a value that is greater than the first threshold value and, as the second threshold value, used may be, for instance, a constant rate of the total capacity of the pool or a predetermined fixed value. In FIG. 14, the rectangle represents the total capacity of the pool, and the shaded area in the rectangle represents the unused capacity.

If the channel adapter 5 obtains a negative result in the determination at step SP20, it urges the administrator to add capacity to the target pool by sending an email to such administrator to notify that the capacity of the target pool fell below the first threshold value (step SP21), and thereafter ends the capacity allocation processing. Incidentally, in substitute for or in addition to the foregoing email, the channel adapter 5 may also display a warning on the management terminal 11 (FIG. 1) indicating that the capacity of the target pool fell below the first threshold value.

Meanwhile, if the channel adapter 5 obtains a positive result in the determination at step SP20, it confirms the policy (this is hereinafter referred to as the "capacity allocation policy") upon allocating the capacity from a predetermined pool to that pool (step SP22).

Specifically, with the storage apparatus 4 according to the present embodiment, the administrator is able to use the management terminal 11 and preliminarily set, for instance, a capacity allocation policy among those shown in FIG. 15; namely, a policy of only enabling the use of a separate pool having the same characteristics as the target pool as the capacity allocation source pool (POLICY 1: "ONLY USE POOL HAVING SAME CHARACTERISTICS AS SELF-POOL"), a policy of giving priority to a separate pool having the same characteristics as the target pool, but also enabling the use of a separate pool having arbitrary characteristics as the capacity allocation source pool (POLICY 2: "PRIORITY IS GIVEN TO POOL HAVING SAME CHARACTERISTICS AS SELF-POOL, BUT POOL OF ARBITRARY CHARACTERISTICS MAY ALSO BE USED"), a policy of allocating the capacity according to a method other than those described above designated in advance by the administrator (POLICY 3: "FOLLOW ALLOCATION POLICY DESIGNATED IN ADVANCE BY ADMINISTRATOR"), or the like.

Figure 16:
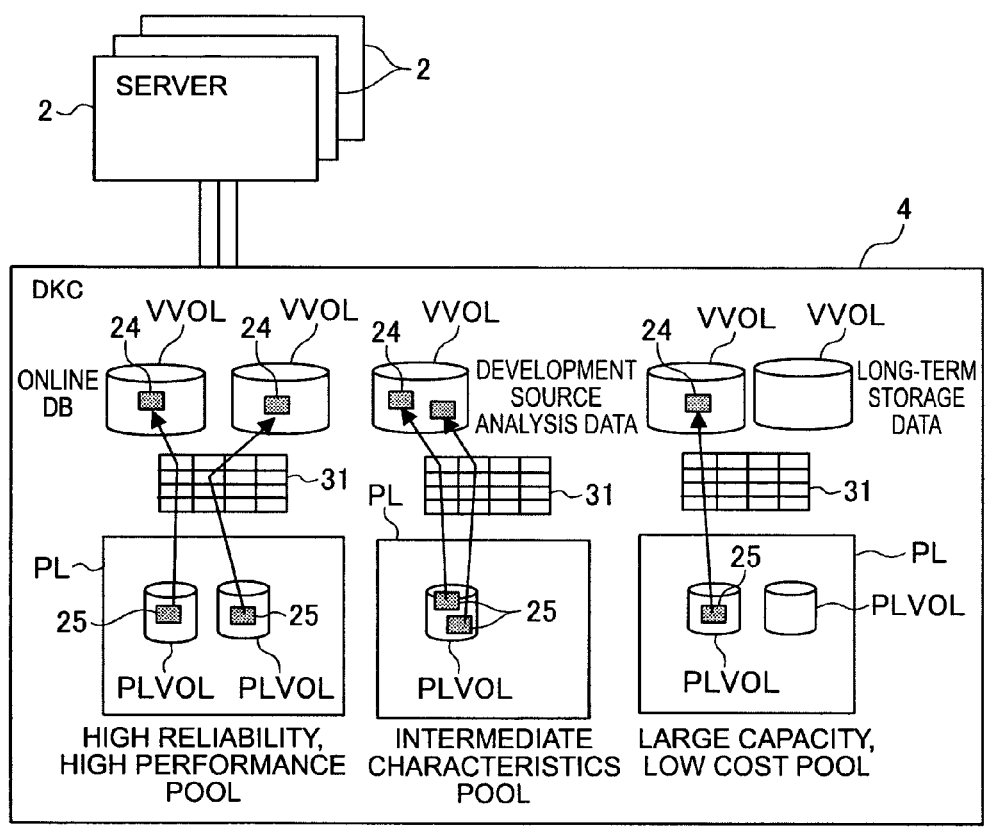
FIG. 16 is a conceptual diagram explaining the allocation policies.

As shown in FIG. 16, this is in order to comply to the requests of users who wish, for example, to constantly allocate a real storage area 25 from a highly reliable, high performance pool PL to a virtual volume VVOL storing data of an online database, allocate a real storage area 25 from a large capacity, low price pool PL to a virtual volume VVOL storing data to be stored for a long time, and allocate a real storage area 25 from a pool PL having intermediate characteristics to a virtual volume VVOL storing development source analysis data. Subsequently, the capacity allocation policy set by the administrator is stored in the shared memory 7 (FIG. 1) of the storage apparatus 4 under the control of the management terminal 11.

When the channel adapter 5 proceeds to step SP22, it accesses the shared memory 7, confirms the capacity allocation policy set by the administrator, and determines whether there is a separate pool that satisfies the capacity allocation policy set by the administrator based on the search results at step SP20 (step SP23).

To obtain a negative result in this determination means that there is no separate pool that satisfies the capacity allocation policy set by the administrator; that is, a capacity cannot be allocated to the target pool. Consequently, the channel adapter 5 notifies the administrator to such effect (step SP21), and thereafter ends the capacity allocation processing.

Meanwhile, to obtain a positive result in the determination at step SP23 means that there is at least one separate pool that satisfies the capacity allocation policy set by the administrator; that is, a capacity can be allocated to the target pool. Consequently, the channel adapter 5 refers to the pool management table 32 (FIG. 6A) and decides the capacity to be allocated from the separate pool to the target pool (step SP24). Specifically, the channel adapter 5 decides a prescribed value, to an extent in which the unused capacity of the separate pool to become the capacity allocation source will not fall below the first threshold value, as the capacity to be allocated from the separate pool to the target pool. The prescribed value may be, for instance, a prescribed ratio of the capacity remaining after subtracting the capacity of the first threshold value from the unused capacity of the separate pool, or a fixed value within the foregoing range.

Subsequently, the channel adapter 5 creates a capacity allocation virtual volume having a memory capacity in the amount of the capacity to be allocated from the separate pool to the target pool (step SP25). The creation of this capacity allocation virtual volume is conducted by registering, in the volume management table 30 (FIG. 4A), the volume number and volume type ("virtual" in this case) of the capacity allocation virtual volume and the pool number of the pool (separate pool in this case) that is associated with the capacity allocation virtual volume. Incidentally, pursuant to the creation of the capacity allocation virtual volume, the virtual volume mapping table 31 (FIG. 5A) of the capacity allocation virtual volume is also created.

Subsequently, the channel adapter 5 allocates a real storage area, which is to be allocated to the target pool in the separate pool, to all volume internal pages in the capacity allocation virtual volume created at step SP25, respectively (step SP26). Specifically, with respect to each entry of the pool internal page corresponding to the real storage area to be allocated to the target pool of the pool real storage area mapping table 33 (FIG. 7) of the separate pool, the channel adapter 5 stores the volume number of the capacity allocation virtual volume in the VVOL volume number column 33BE, and sequentially stores, in the VVOL internal page number column 33BF, the volume internal page number of each volume internal page in the capacity allocation virtual volume.

Subsequently, by registering the capacity allocation virtual volume in the pool volume list portion 32B in the pool management table 32 (FIG. 6A) of the target pool, the channel adapter 5 additionally registers the capacity allocation virtual volume as the configuration pool of the target pool (step SP27). In connection with the foregoing process, the channel adapter 5 also updates the pool unused capacity column 32AD in the pool management table 32 of the target pool, updates the pool real storage area mapping table 33 (FIG. 7) corresponding to the target pool, updates the pool unused capacity column 34BC of the target pool and separate pool in the pool list 34 (FIG. 8), and creates the pool volume management table 35 (FIG. 9) of the capacity allocated virtual volume.

Subsequently, the channel adapter 5 determines whether the required capacity has been allocated to the target pool (step SP27). This determination is made by referring to the pool unused capacity column 32AD in the pool management table 32 (FIG. 6A) of the target pool.

If the channel adapter 5 obtains a negative result in this determination, it returns to step SP20, and thereafter repeats the same processing until it obtains a positive result at step SP28 (step SP20 to SP28-SP20). When the channel adapter 5 eventually obtains a positive result at step SP28, it ends the capacity allocation processing.

If the volume internal page of the virtual volume to be provided to the server 2 is associated with the volume internal page of the capacity allocation virtual volume added to the pool as a pool volume, the reading and writing of data from and into that virtual volume will be performed to the real storage area in the pool associated with the capacity allocation virtual volume.

As a means for achieving the above, the channel adapter 5 performs step SP2 of the read processing explained above with reference to FIG. 11 and step SP11 of the write processing explained above with reference to FIG. 12 according to the following processing routine.

Specifically, the channel adapter 5 searches, from the pool real storage area mapping table 33, for the volume number of a pool volume providing the real storage area allocated to the volume internal page including the block address designated as the read or write destination of data in the read request or the write request.

Based on the search results, the channel adapter 5 determines whether that pool volume is a virtual volume; that is, whether it is a capacity allocation virtual volume by referring to the volume management table 30 (FIG. 4A). If that pool volume is a capacity allocation virtual volume, the channel adapter 5 searches for the real storage area associated with the volume internal page to become the read or write destination of data in the capacity allocation virtual volume in the pool real storage area mapping table 33 of the pool associated with that capacity allocation virtual volume, and reads or writes data from or into that real storage area.

(3-2-2) Allocated Capacity Return Processing

Figure 17:
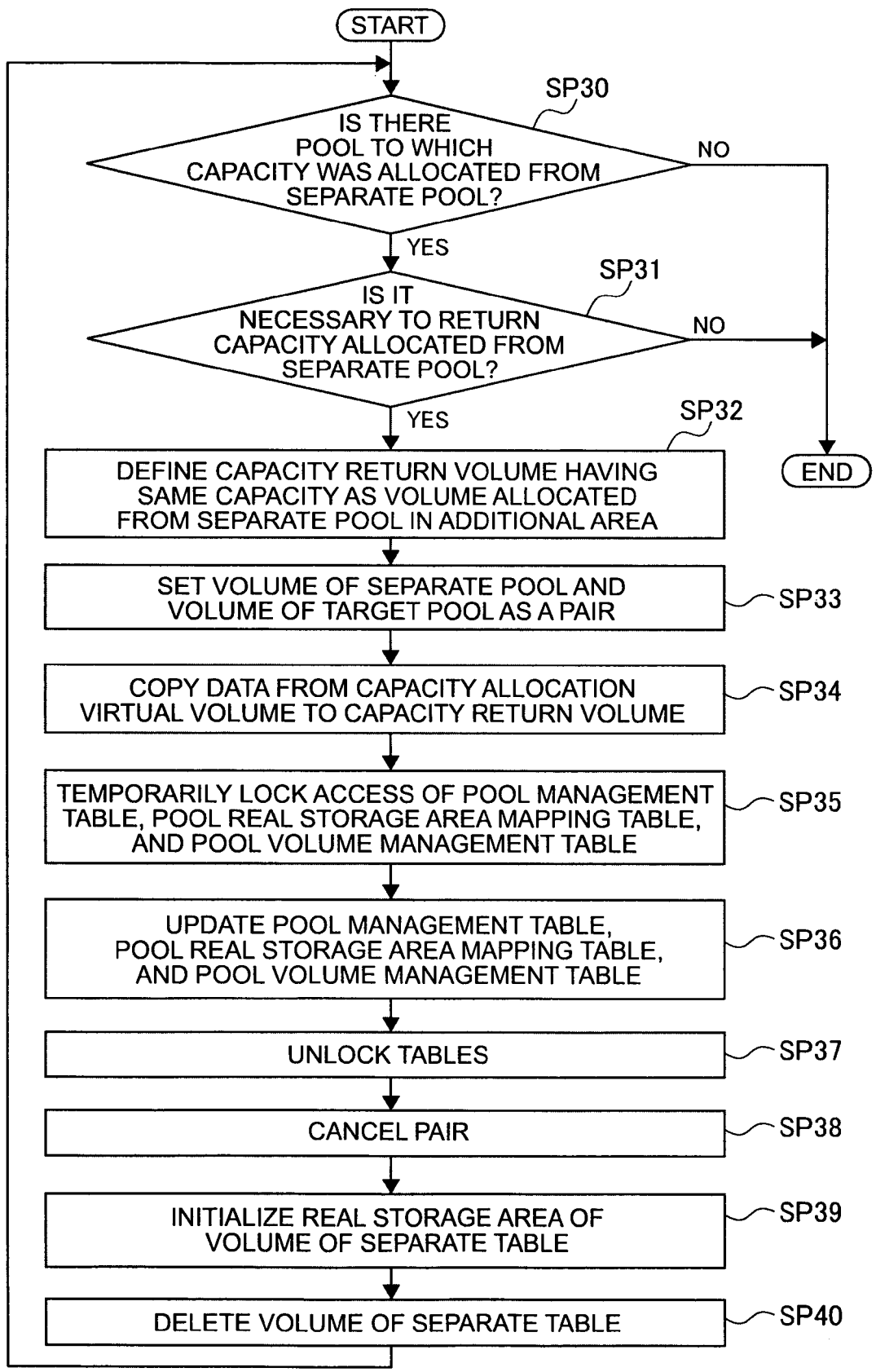
FIG. 17 is a flowchart showing the processing routine of allocated capacity return processing.

Meanwhile, FIG. 17 shows the processing routine of the allocated capacity return processing to be executed by the channel adapter 5 when a hard disk device 9 is added to the storage apparatus 4.

The channel adapter 5 starts the allocated capacity return processing when a hard disk device 9 is additionally mounted on the storage apparatus 4, and foremost determines whether there is a pool to which capacity was allocated from the separate pool (step SP30). This determination can be made, for instance, by referring to the pool management table 32 (FIG. 6A) and the volume management table 30 (FIG. 4A) of each pool and determining whether a virtual volume (capacity allocated virtual volume) exists as the configuration volume of any one of the pools. If the channel adapter 5 obtains a negative result in this determination, it ends the allocated capacity return processing.

Meanwhile, if the channel adapter 5 obtains a positive result in the determination at step SP30, it determines, based on a pre-set capacity return requirement policy, whether to return the capacity, which was allocated from a separate pool to a pool (this is hereinafter referred to as the "target pool") to which the capacity from the separate pool is presumed to have been allocated, to the original separate pool (step SP31).

Specifically, with the storage apparatus 4 according to the present embodiment, the administrator is able to use the management terminal 11 and preliminarily set, for instance, a capacity return requirement policy among those shown in FIG. 18; namely, a policy of unconditionally returning the capacity if such capacity had been allocated from the separate pool (POLICY 1: "RETURN UNCONDITIONALLY"), a policy of not returning the capacity if the characteristics of the target pool and the separate pool are the same, and returning the capacity from the target pool to the separate pool if the characteristics are different (POLICY 2: "LEAVE AS IS IF POOL CHARACTERISTICS ARE SAME, AND RETURN IF POOL CHARACTERISTICS ARE DIFFERENT"), a policy of following the instructions set by the administrator in advance (POLICY 3: "FOLLOW ADMINISTRATOR'S INSTRUCTIONS"), a policy of not returning the capacity for the time being, and returning the capacity at the timing set by the administrator in advance such as at the time of a planned shutdown or on a date in which, statistically, the load will be light (POLICY 4: "DO NOT RETURN FOR TIME BEING, AND RETURN AT PREDETERMINED TIMING"), a policy of not returning the capacity at all (POLICY 5: "CONTINUE USING UNCONDITIONALLY"), or the like. The capacity return requirement policy set by the administrator is stored in the shared memory 7 (FIG. 1) of the storage apparatus 4.

When the channel adapter 5 proceeds to step SP31, it accesses the shared memory 7, confirms the capacity return requirement policy set by the administrator, and determines whether it is necessary to return the capacity, which was allocated from the separate pool to the target pool, to the separate pool (step SP31).

If the channel adapter 5 obtains a negative result in this determination, it ends the allocated capacity return processing. Meanwhile, if the channel adapter 5 obtains a positive result in the determination at step SP31, it defines a capacity return volume having the same capacity as the capacity that was allocated from the separate pool to the target pool in the storage area provided by the additionally mounted hard disk device 9, and registers the capacity return volume in the volume management table 30 (step SP32).

Subsequently, the channel adapter 5 sets the capacity return volume and the capacity allocation virtual volume created at step SP25 of the capacity allocation processing explained above with reference to FIG. 13 as a copy pair (step SP33). Specifically, a copy pair is set by registering the capacity allocation virtual volume as the copy source and the capacity return LDEV as the copy destination in the copy pair management table (not shown). In connection with the setting of the foregoing copy pair, the channel adapter 5 also creates a copy status management table 36 (FIG. 10) with the capacity return volume and the capacity allocation virtual volume as the copy destination volume and the copy source volume, respectively.

The channel adapter 5 thereafter uses the copy status management table 36 created as described above and copies the data stored in the capacity allocation virtual volume to the capacity return volume (step SP34). Incidentally, the "data stored in the capacity allocation virtual volume" is in fact stored in a real storage area allocated to the capacity allocation virtual volume in a separate volume and, therefore, it goes without saying that the foregoing copy is performed from the real storage area to the capacity return volume.

In addition, the channel adapter 5 temporarily locks the pool management table 32 (FIG. 6A), the pool real storage area mapping table 33 (FIG. 7) and the pool volume management table 35 (FIG. 9) of the target pool so that the other channel adapter 5 cannot access such tables (step SP35), and thereafter rewrites the volume number of the capacity allocation virtual volume registered in the pool management table 32, the pool real storage area mapping table 33 and the pool volume management table 35 with the volume number of the capacity return volume (step SP36).

Subsequently, the channel adapter 5 unlocks the pool management table 32, the pool real storage area mapping table 33 and the pool volume management table 35 (step SP37), cancels the copy pair set at step SP33 (step SP38), and thereafter initializes the real storage area that was allocated to the capacity allocation virtual volume in the separate pool (step SP39). The channel adapter 5 thereafter deletes the capacity allocation virtual volume (step SP40), and then ends the allocated capacity return processing.

(3-2-3) Volume Copy Processing

Figure 19:
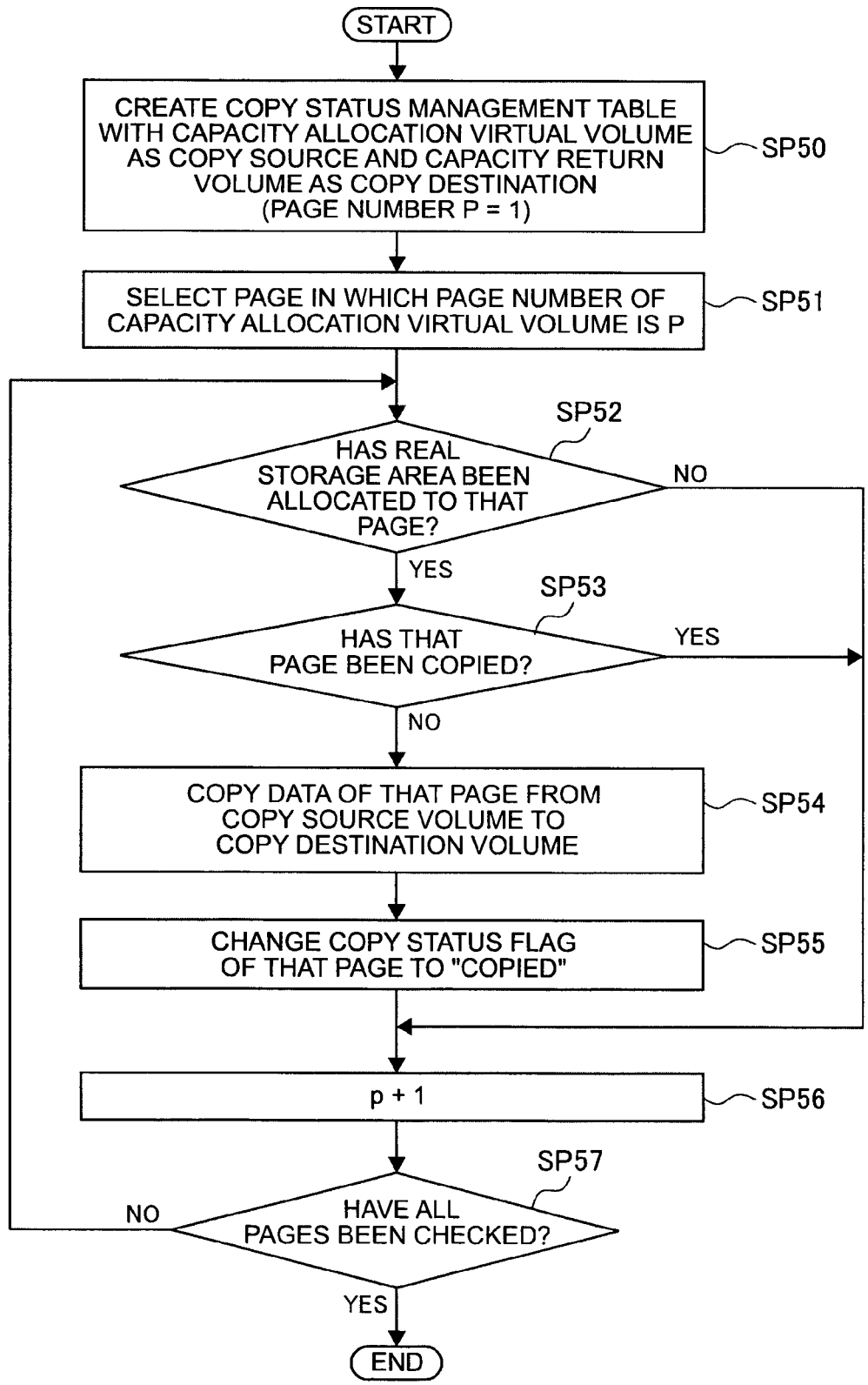
FIG. 19 is a flowchart showing the processing routine of volume copy processing.

FIG. 19 shows the specific processing contents of the volume copy processing to be executed at step SP34 of the capacity return processing explained above with reference to FIG. 18.

The channel adapter 5 starts the volume copy processing upon proceeding to step SP34 of the allocated capacity return processing, and foremost creates a copy status management table 36 (FIG. 10) with a capacity allocation virtual volume of a separate volume as the copy source and a capacity return volume as the copy destination. The channel adapter 5 also sets "1" as the volume internal page number p of the volume internal page that is currently being processed in the copy source volume (step SP50).

Subsequently, the channel adapter 5 selects a page among the volume internal pages in the capacity allocation virtual volume in which the page number is "p" (step SP51), and determines whether a real storage area has been allocated to this volume internal page based on the virtual volume mapping table 31 (FIG. 5A) of the capacity allocation virtual volume (step SP52).

If the channel adapter 5 obtains a negative result in the determination at step SP52, it proceeds to step SP56. Meanwhile, if the channel adapter 5 obtains a positive result in the determination at step SP52, it determines whether the data stored in the volume internal page of the capacity allocation virtual volume has been copied to the capacity return volume based on the copied/uncopied flag stored in the corresponding copied/uncopied flag column 36BB (FIG. 10) of the copy status management table 36 (FIG. 10) created at step SP50 (step SP53).

If the channel adapter 5 obtains a positive result in the determination at step SP53, it proceeds to step SP56. Meanwhile, if the channel adapter 5 obtains a negative result in the determination at step SP53, it copies the data stored in the volume internal page in which the page number of the capacity allocation virtual volume as the copy source volume is "p" to the volume internal page in which the page number of the capacity return volume as the copy destination volume is also "p" (step SP54).

Subsequently, the channel adapter 5 changes the copied/uncopied flag stored in the copied/uncopied flag column 36BB of the copy status management table 36 in the page number is "p" to "1" which represents that the copying of data is complete (step SP55).

The channel adapter 5 thereafter increments the value of "p" (updates "p" to "p+1") (step SP56), and then determines whether "p" became greater than the number of pages of the volume internal page of the capacity allocation virtual volume by referring to the virtual volume mapping table 31 (FIG. 5A) of the capacity allocation virtual volume (step SP57).

If the channel adapter 5 obtains a negative result in this determination, it returns to step SP52, and thereafter repeats the same processing until it obtains a positive result at step SP57 (step SP52 to SP57-SP52). When the channel adapter 5 eventually obtains a positive result at step SP57 as a result of the copying for all volume internal pages of the capacity allocation virtual volume being complete, it ends the volume copy processing.

(3-2-4) Mid-copy Read Processing

Figure 20:
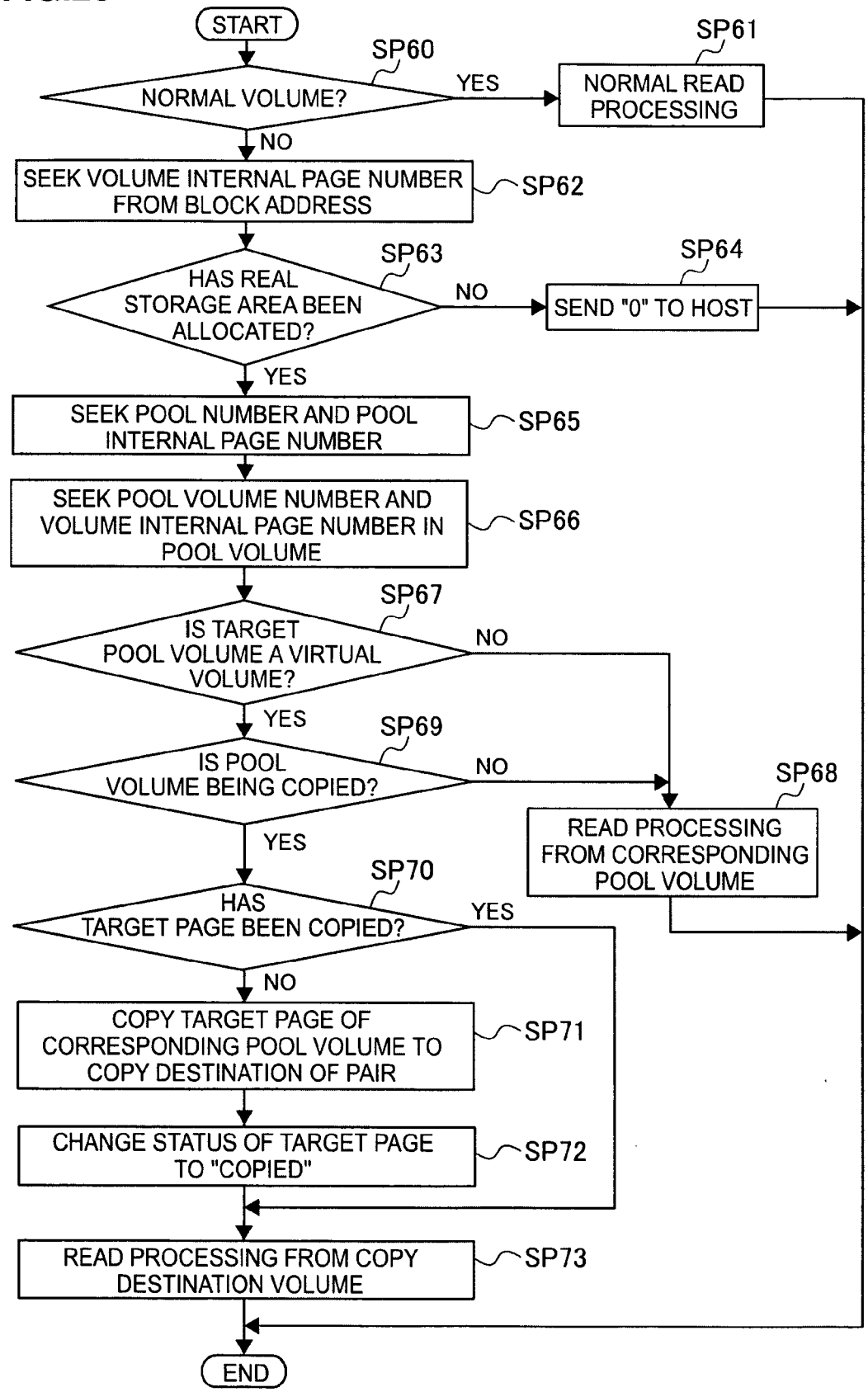
FIG. 20 is a flowchart showing the processing routine of mid-copy read processing.

FIG. 20 shows the processing contents of the channel adapter 5 in a case where a read request is given from the server 2 to the storage apparatus 4 during the execution of the foregoing volume copy processing. In the case of this embodiment, the channel adapter 5 stores a flag (this is hereinafter referred to as the "volume copy flag") at a prescribed position of the shared memory 7 upon executing the volume copy processing explained above with reference to FIG. 19.

If the channel adapter 5 receives a read request from the server 2, it foremost accesses the shared memory 7 to confirm the volume copy flag. If none of the channel adapters 5 are executing the volume copy processing, the channel adapter 5 executes the read processing explained above with reference to FIG. 11, and, if any one of the channel adapters 5 is executing the volume copy processing, the channel adapter 5 executes the mid-copy read processing shown in FIG. 20.

Specifically, in a case where the channel adapter 5 receives a read request from the server 2 and confirms that none of the channel adapters 5 are executing the volume copy processing based on the volume copy flag, the channel adapter 5 foremost determines whether the logical volume designated as the read destination in the read request is a tangible normal volume based on the volume management table 30 (FIG. 4A) (step SP60).

If the channel adapter 5 obtains a positive result in this determination, it executes the normal read processing (step SP61), and thereafter ends the mid-copy read processing.

Meanwhile, if the channel adapter 5 obtains a negative result in this determination, it seeks the volume internal page number of the volume internal page contained in the block address designated as the read destination in the read request among the volume internal pages in the logical volume (which is a virtual volume, and this is hereinafter indicated as the "virtual volume") designated as the read destination in the read request (step SP62). The pool internal page number can be obtained by dividing the block address designated as the read destination in the read request by the page size (number of blocks per page).

The channel adapter 5 subsequently refers to the virtual volume mapping table 31 (FIG. 5A) of the virtual volume designated as the read destination in the read request, and determines whether a real storage area has been allocated to the volume internal page of the volume internal page number sought at step SP62 (step SP63).

If the channel adapter 5 obtains a negative result in this determination, it sends "0" as read data to the server 2 (step SP64), and thereafter ends the mid-copy read processing.

Meanwhile, if the channel adapter 5 obtains a positive result in the determination at step SP64, it refers to the virtual volume mapping table 31 (FIG. 5A) of that virtual volume, and searches for the pool number of the pool to provide the real storage area allocated to the volume internal page of the volume internal page number sought at step SP62, and the pool internal page number of the real storage area (step SP65).

Subsequently, based on the pool number and the pool internal page number obtained at step SP65, the channel adapter 5 searches for the volume number of the pool volume storing the read-target data and the volume internal page number of the volume internal page storing the data in that pool volume from the pool real storage area mapping table 33 (FIG. 7) of the pool of the pool number detected at step SP65 (step SP66).

The channel adapter 5 additionally determines whether the pool volume in which the volume number was detected at step SP66 is a virtual volume based on the volume management table 30 (FIG. 4A).

To obtain a negative result in this determination means that the pool volume is not a capacity allocation virtual volume. Consequently, the channel adapter 5 reads the read-target data from the address position designated in the read request in the virtual volume designated in the read request by executing the read processing explained above with reference to FIG. 11, and sends the obtained data to the server 2 (step SP68). The channel adapter 5 thereafter ends the mid-copy read processing.

Meanwhile, to obtain a positive result in the determination at step SP67 means that the pool volume is a capacity allocation virtual volume. Consequently, the channel adapter 5 refers to the pool volume management table 35 (FIG. 9) of the pool volume in which the volume number was obtained at step SP66, and determines whether the volume copy processing explained above with reference to FIG. 19 is currently being executed to that pool volume (step SP69).

If the channel adapter 5 obtains a negative result in this determination, it proceeds to step SP68 and causes the data designated in the read request to be read, sends the data to the server 2 (step SP68), and thereafter ends the read processing.

Meanwhile, if the channel adapter 5 obtains a positive result in the determination at step SP69, it refers to the corresponding copy status management table 36 (FIG. 10) based on the volume number acquired at step SP66, and determines whether the copying of the volume internal page of the volume internal page number acquired at step SP66 is complete (step SP70).

If the channel adapter 5 obtains a positive result in this determination, it proceeds to step SP73. Meanwhile, if the channel adapter 5 obtains a negative result in this determination, it copies the data (read-target data) stored in the targeted volume internal page (volume internal page from which the data is to be read) of the pool volume (capacity allocation virtual volume) of that volume number to the logical volume (capacity return volume) forming a copy pair with that pool volume (step SP71).

Subsequently, the channel adapter 5 changes the copied/uncopied flag of the volume internal page that was subject to the copy processing at step SP71 among the respective copied/uncopied flags in the corresponding copy status management table 36 (FIGS. 10) to "1" which represents that the copying of data is complete (step SP72).

Subsequently, the channel adapter 5 controls the corresponding disk adapter 8 and causes it to read the read-target data designated in the read request from the copy destination volume (capacity return volume), sends this to the server 2 (step SP73), and thereafter ends the mid-copy read processing.

(3-2-5) Mid-copy Write Processing

Figure 21:
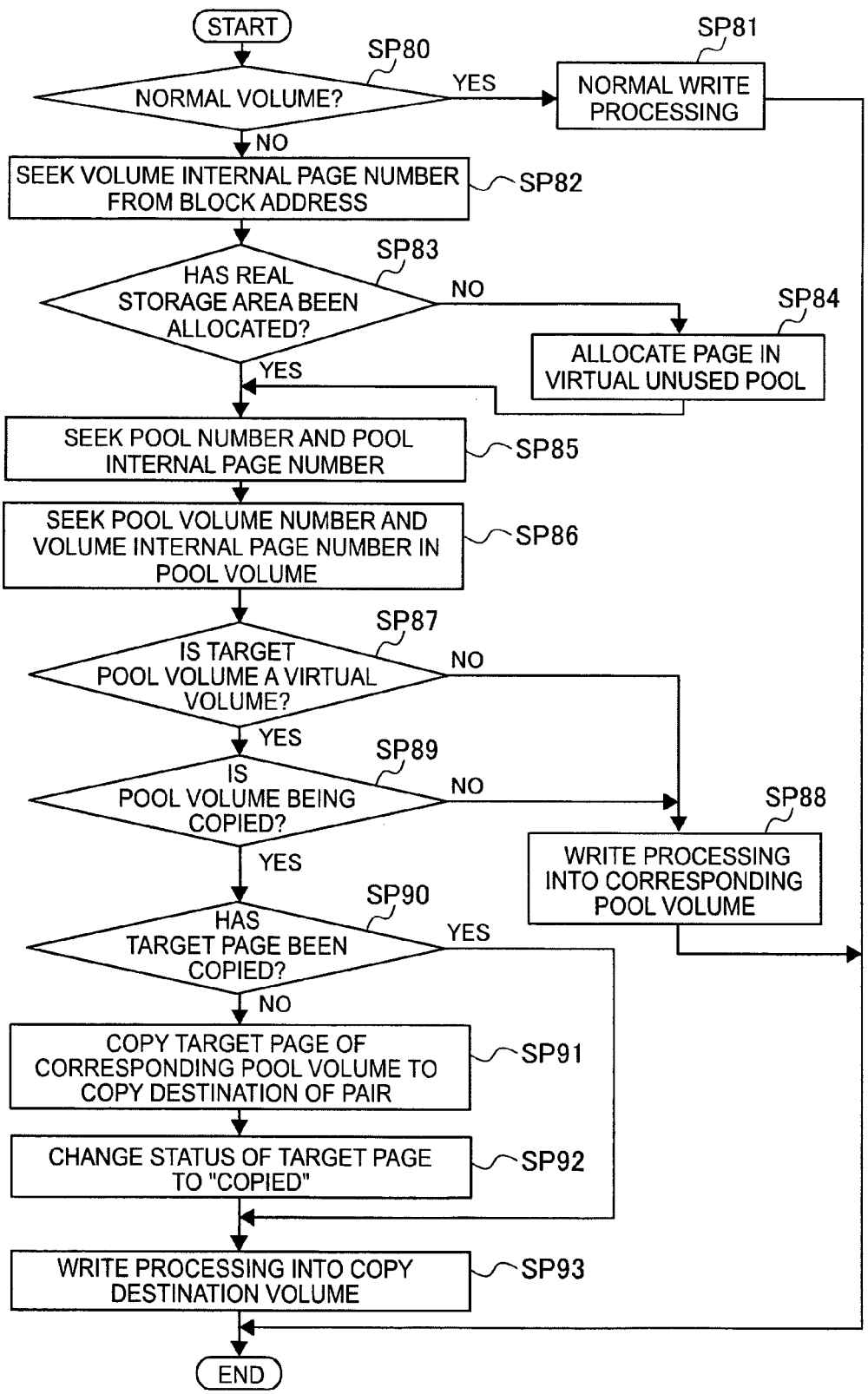
FIG. 21 is a flowchart showing the processing routine of mid-copy write processing.

FIG. 21 shows the processing contents of the channel adapter 5 in a case where a write request is given from the server 2 to the storage apparatus 4 during the execution of the foregoing volume copy processing. Specifically, if the channel adapter 5 receives a write request from the server 2, it foremost accesses the shared memory 7 to confirm the volume copy flag. If none of the channel adapters 5 are executing the volume copy processing, the channel adapter 5 executes the write processing explained above with reference to FIG. 12, and, if any one of the channel adapters 5 is executing the volume copy processing, the channel adapter 5 executes the mid-copy write processing shown in FIG. 21.

Specifically, in a case where the channel adapter 5 receives a write request from the server 2 and confirms that none of the channel adapters 5 are executing the volume copy processing based on the volume copy flag, the channel adapter 5 foremost determines whether the logical volume designated as the write destination in the write request is a tangible normal volume based on the volume management table 30 (FIG. 4A) (step SP80).

If the channel adapter 5 obtains a positive result in this determination, it executes the normal write processing (step SP81), and thereafter ends the mid-copy write processing.

Meanwhile, if the channel adapter 5 obtains a negative result in this determination, it seeks the volume internal page number of the volume internal page contained in the block address designated as the write destination in the write request among the volume internal pages in the logical volume (which is a virtual volume, and this is hereinafter indicated as the "virtual volume") designated as the write destination in the write request (step SP82).

The channel adapter 5 subsequently refers to the virtual volume mapping table 31 (FIG. 5A) of the virtual volume designated as the write destination in the write request, and determines whether a real storage area has been allocated to the volume internal page of the volume internal page number sought at step SP82 (step SP83).

If the channel adapter 5 obtains a negative result in this determination, it refers to the virtual volume mapping table 31 of the virtual volume of the write destination and acquires the pool number of the pool that is associated with that virtual volume, and refers to the pool real storage area mapping table of that pool and allocates a real storage area (pool internal page in that pool) to the page in the block designated as the write destination in the virtual volume designated as the write destination in the write request (step SP84).

Subsequently, the channel adapter 5 performs the processing of step SP85 to step SP87 as with step SP65 to step SP67 of FIG. 20. If the channel adapter 5 obtains a negative result in the determination at step SP87, it executes the write processing explained above with reference to FIG. 12 and writes the write-target data in the pool volume of the pool volume number acquired at step SP86 with the volume internal page of the volume internal page number acquired at step SP86 as the top page (step SP88). The channel adapter 5 thereafter ends the mid-copy write processing.

Meanwhile, if the channel adapter 5 obtains a negative result in the determination at step SP87, it thereafter performs the processing of step SP89 to step SP92 as with step SP69 to step SP72 of FIG. 20, and then controls the corresponding disk adapter 8 and causes it to write the write data in the corresponding position in the copy destination volume (capacity return volume) (step SP93). The channel adapter 5 thereafter ends the mid-copy write processing.

(3-3) Configuration of Various Screens Displayed on Management Terminal

Figure 22:
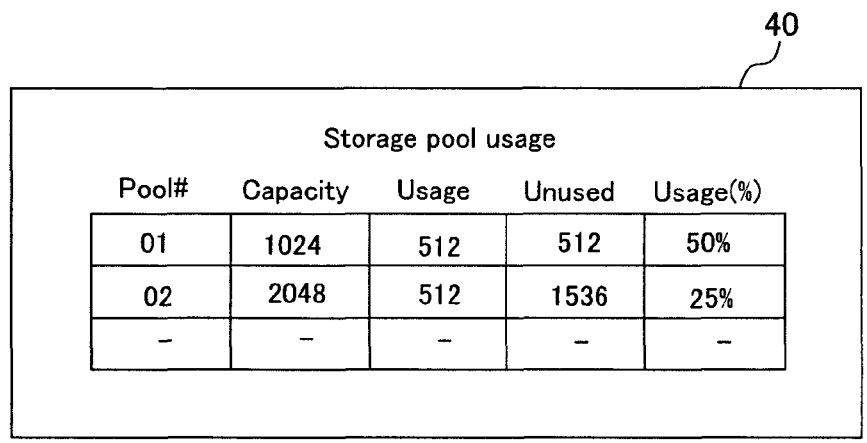
FIG. 22 is a schematic diagram showing a configuration example of a pool usage status list screen.

FIG. 22 shows a pool usage status list screen 40 to be displayed on the management terminal according to the administrator's operation. The pool usage status list screen 40 is a screen for displaying the usage status of the respective pools set in the storage apparatus 4. Specifically, the pool usage status list screen 40 displays, as a list regarding all pools set in the storage apparatus 4, the pool number ("Pool#") of that pool, the total capacity ("Capacity") of that pool, the used capacity ("Usage") of that pool, the unused capacity ("Unused") of that pool, and the ratio ("Usage %") of the used capacity in relation to the total capacity in that pool. Incidentally, the information to be displayed on the pool usage status list screen 40 was acquired by the management terminal 11 based on the pool list 34 after the management terminal 11 read such pool list 34 (FIG. 8) in the shared memory 7 via the internal bus 10.

Figure 23:
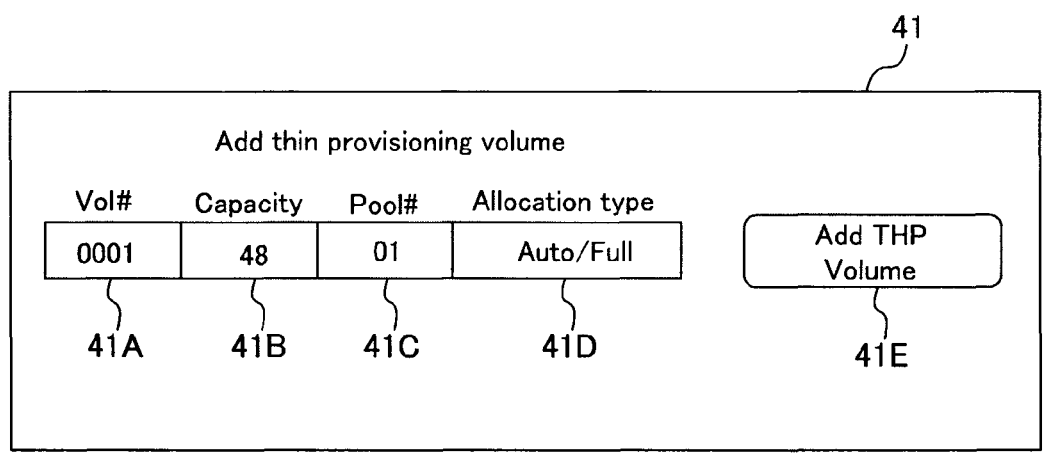
FIG. 23 is a schematic diagram showing a configuration example of a virtual volume definition screen.

FIG. 23 shows a virtual volume definition screen 41 to be displayed on the management terminal 11 according to the administrator's operation. The virtual volume definition screen 41 includes a volume number designation column 41A for designating the volume number of the virtual volume to be newly defined, a capacity designation column 41B for designating the capacity (total number of pages) of that virtual volume, a pool number designation column 41C for designating the pool number of the pool with which that virtual volume is to be associated, and an allocation type designation column 41D for designating the allocation type (there are two types in the case of this embodiment; namely, the ("Auto") type that sequentially allocates storage areas to a virtual volume only regarding areas that were accessed, and the ("Full") type that allocates storage areas to the overall virtual volume) of that virtual volume.

Consequently, the administrator inputs the required information in the volume number designation column 41A, the capacity designation column 41B, the pool number designation column 41C and the allocation type designation column 41D, respectively, and thereafter clicks an add button 41E so as to create the virtual volume having the designated volume number, capacity and the like.

In fact, when the add button 41E is clicked after the required information is input to the volume number designation column 41A, the capacity designation column 41B, the pool number designation column 41C and the allocation type designation column 41D, the management terminal 11 registers the virtual volume defined by the administrator in the virtual volume definition screen 41 together with the volume management table 30 (FIG. 4A) and the corresponding pool management table 32 (FIG. 6A) and pool real storage area mapping table 33 (FIG. 7), and also creates the virtual volume mapping table 31 (FIG. 5A) of the virtual volume. The virtual volume is thereby created in the storage apparatus 4.

Figure 24:
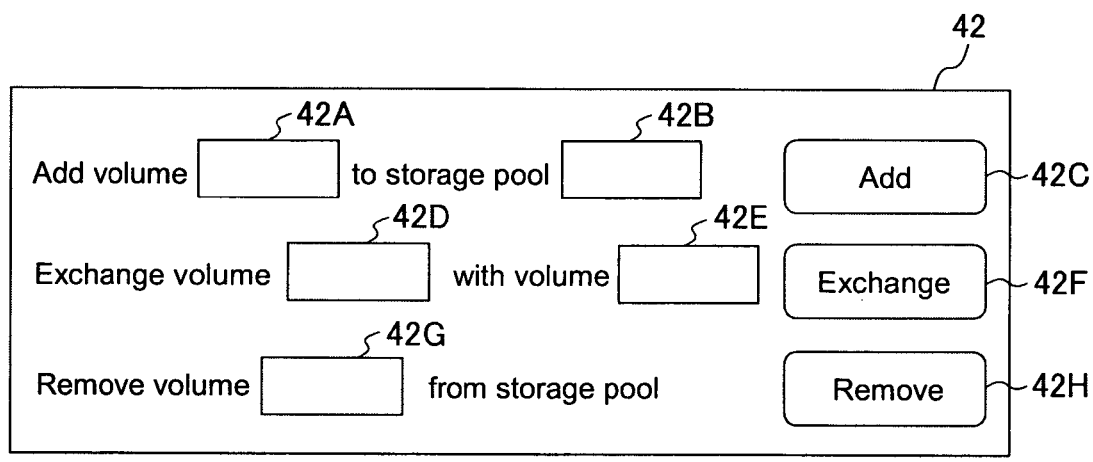
FIG. 24 is a schematic diagram showing a configuration example of a pool operation screen.

Meanwhile, FIG. 24 shows a pool operation screen 42 to be displayed on the management terminal 11 according to the administrator's operation. The pool operation screen 42 is a screen for conducting operations to the intended pool among the pools set in the storage apparatus 4.

In fact, with the pool operation screen 42, by inputting the pool number of the pool in the pool number input column 42A, inputting the volume number of the logical volume (normal volume or capacity allocation virtual volume) to be added as a pool volume to that pool in the volume number input column 42B, and thereafter clicking the add button 42C, that logical volume can be added as a pool volume to that pool. In the foregoing case, the management terminal 11 updates the corresponding pool management table 32 (FIG. 6A) stored in the shared memory 7 according to such administrator's operation.

Moreover, with the pool operation screen 42, by inputting the volume number of the pool volume configuring any one of the pools in the exchange source volume number input column 42D, inputting the volume number of the other volumes in the exchange destination volume number input column 42E, and thereafter clicking the exchange button 42F, it is possible to exchange the pool volume configuring the corresponding pool from the logical volume in which the volume number was input to the exchange source volume number input column 42D to the logical volume in which the volume number was input to the exchange destination volume number input column 42E. In the foregoing case, the management terminal 11 updates the pool management table 32 (FIG. 6A) and the corresponding pool real storage area mapping table 33 (FIG. 7) stored in the shared memory 7 according to such administrator's operation.

Further, with the pool operation screen 42, by inputting the volume number of the pool volume configuring any one of the pools in the deletion-target volume number column 42G, and thereafter clicking the delete button 42H, it is possible to delete the pool volume in which the volume number was input to the deletion-target volume number column 42G from the configuration pool of the corresponding pool. In the foregoing case, the management terminal 11 updates the pool management table 32 and the like stored in the shared memory 7 according to such administrator's operation.

Figure 25:
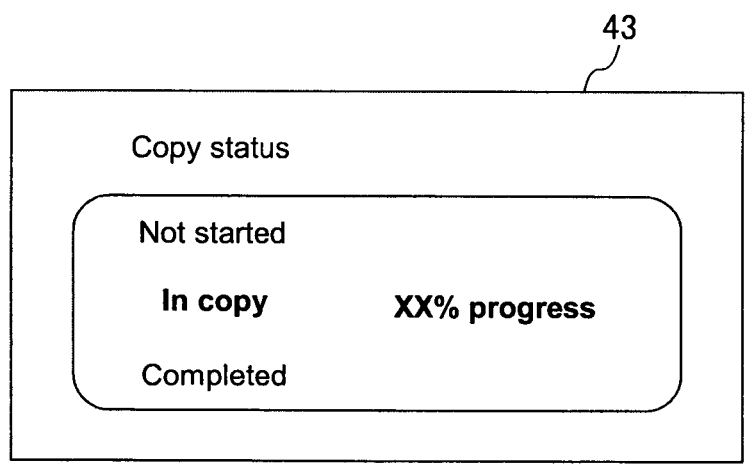
FIG. 25 is a schematic diagram showing a configuration example of a volume copy information screen.

Meanwhile, FIG. 25 is a volume copy information screen 43 to be displayed on the management terminal 11 according to the administrator's operation. The volume copy information screen 43 is a screen for displaying the process of the volume copy processing explained above with reference to FIG. 19, and displays the copy status (whether copying is in progress) and the progress ratio of the copying process. Incidentally, the information to be displayed on the volume copy information screen 43 was acquired by the management terminal 11 based on the pool volume management table 35 and the copy status management table 36 after the management terminal 11 read the corresponding pool volume management table 35 (FIG. 9) and the copy status management table 36 (FIG. 10) from the shared memory 7 via the internal bus 10.

(4) Effects of this Embodiment

As described above, with the computer system 1 according to the present embodiment, the unused capacity of each pool set in the storage apparatus 4 is monitored, and, since the capacity from other pools is allocated to a pool when the unused capacity of such pool falls below a threshold value, it is possible to effectively prevent the occurrence of a situation where write data from the server 2 cannot be written as a result of the unused capacity of the pool running short or becoming depleted. Consequently, it is possible to realize a highly reliable computer system and a storage apparatus.

(5) Other Embodiments

In the embodiment described above, although a case was explained where the present invention is applied to the storage apparatus 4 configured as illustrated in FIG. 1, the present invention is not limited thereto, and may also be broadly applied to storage apparatuses of various configurations.

Moreover, in the embodiment described above, although a case was explained where the hard disk devices 9 were applied as the memory devices to be mounted on the storage apparatus 4, the present invention is not limited thereto, and other memory devices such as a semiconductor memory may also be applied.

Figure 26:
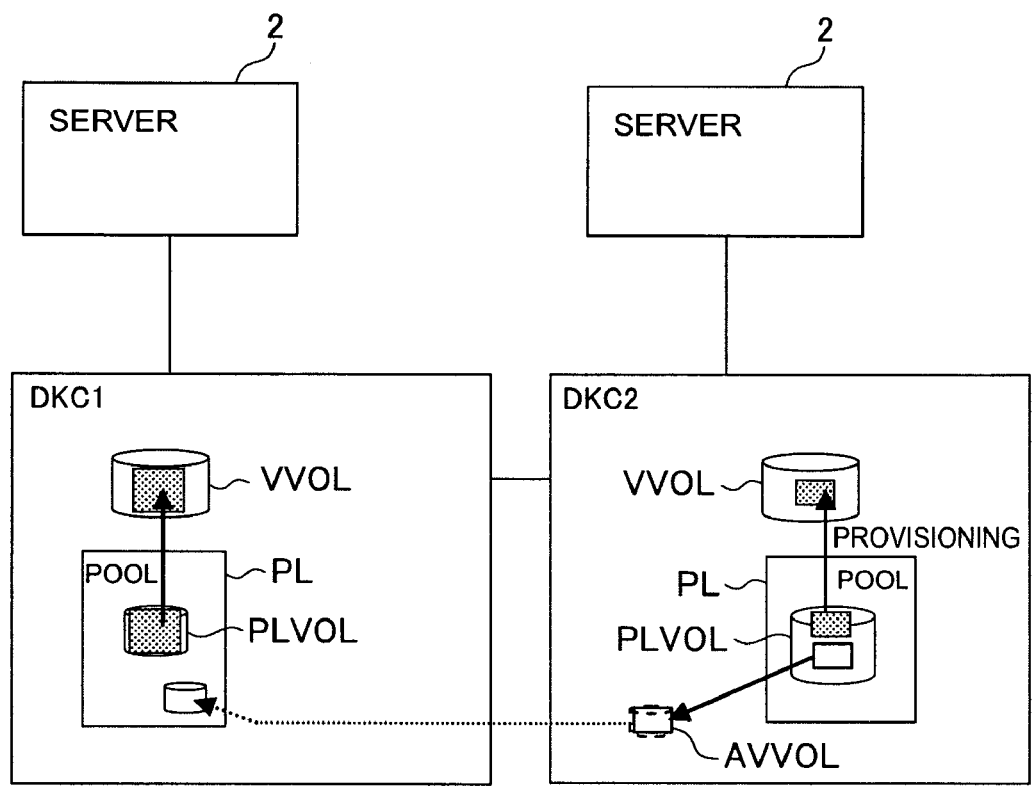
FIG. 26 is a block diagram explaining another embodiment of the present invention.

Further, in the embodiment described above, although a case was explained where the capacity among pools was lent and borrowed within a single storage apparatus 4, the present invention is not limited thereto and, as shown in FIG. 26 for instance, the capacity may be lent and borrowed among different storage apparatus as in the embodiment described above.

In addition, in the embodiment described above, although a case was explained where the first threshold value in FIG. 14 is a value in which the unused capacity is greater than "0," the present invention is not limited thereto, and the first threshold value may be "0." Incidentally, if the first threshold value is set to "0," the capacity allocation processing explained above with reference to FIG. 13 will be started when the unused capacity of the pool becomes depleted.

Industrial Applicability

The present invention can be broadly applied to storage apparatuses of various configurations equipped with the dynamic provisioning function.

The invention claimed is:

1. A storage apparatus, comprising:
a first plurality of storage devices configuring a first plurality of storage regions;
a second plurality of storage devices configuring a second plurality of storage regions; and
a controller configured to:
manage the first plurality of storage regions as a first storage pool;
manage the second plurality of storage regions as a second storage pool;
provide a first virtual volume to a host system, at least one of the first plurality of storage regions of the first storage pool being dynamically allocated to the first virtual volume in accordance with an access received from the host system for the first virtual volume;
provide a second virtual volume to the host system, at least one of the second plurality of storage regions of the second storage pool being dynamically allocated to the second virtual volume in accordance with an access received from the host system for the second virtual volume; and
manage an unused capacity in each of the first storage pool and the second storage pool, and
wherein, upon the unused capacity of the first storage pool falling below a predetermined threshold value, the controller allocates a first storage region that is included in the second plurality of storage regions of the second storage pool and has not been allocated to the second virtual volume to the first storage pool so that the first storage region can be allocated to the first virtual volume, and
wherein, upon a third plurality of storage devices configuring a third plurality of storage regions being added to the storage apparatus, the controller copies data stored in the first storage region to at least one of the third plurality of storage regions, adds the at least one of the third plurality of storage regions to the first storage pool, and returns allocation of the first storage region from the first storage pool to the second storage pool.

2. The storage apparatus according to claim 1, wherein, upon the unused capacity of the first storage pool falling below the predetermined threshold value, the controller decides a capacity to be allocated from the second storage pools to the first storage pool, allocates first storage region to the first storage pool according to the decided capacity, and allocates the first storage region to the first virtual volume.

3. The storage apparatus according to claim 1, wherein the controller deletes the data stored in the first storage region upon adding the at least one of the third storage regions to the first storage pool.

4. The storage apparatus according to claim 1, wherein, upon the unused capacity of the first storage pool falling below the predetermined threshold value, the controller determines whether to allocate part of the unused capacity from the second storage pool to the first storage pool based on a pre-set first policy, and allocates a part of the unused capacity of from the second storage pool to the first storage pool when it determines that a part of the unused capacity should be allocated.

5. The storage apparatus according to claim 1, wherein, upon the third plurality of storage devices being added to the storage apparatus, the controller determines whether to execute processing of copying data stored in the first storage region to at least one of the third plurality of storage regions and adding the at least one of the third plurality of storage regions to the first storage pool according to a pre-set second policy, and executes the processing upon determining that the processing should be executed.

6. A control method for a storage apparatus including a first plurality of storage devices configuring a first plurality of storage regions, a second plurality of storage devices configuring a second plurality of storage regions, and a controller configured to manage the first plurality of storage regions as a first storage pool, manage the second plurality of storage regions as a second storage pool, provide a first virtual volume to a host system, at least one of the first plurality of storage regions of the first storage pool being dynamically allocated to the first virtual volume in accordance with an access received from the host system for the first virtual volume, provide a second virtual volume to the host system, at least one of the second plurality of storage regions of the second storage pool being dynamically allocated to the second virtual volume in accordance with an access received from the host system for the second virtual volume, and manage an unused capacity in each of the first storage pool and the second storage pool, the control method comprising:
upon the unused capacity of the first storage pool falling below a predetermined threshold value, allocating a first storage region that is included in the second plurality of storage regions of the second storage pool and has not been allocated to the second virtual volume to the first storage pool so that the first storage region can be allocated to the first virtual volume; and upon a third plurality of storage devices configuring a third plurality of storage regions being added to the storage apparatus, copying data stored in the first storage region to at least one of the third plurality of storage regions, adding the at least one of the third plurality of storage regions to the first storage pool, and returning allocation of the first storage region from the first storage pool to the second storage pool.

7. The control method for a storage apparatus according to claim 6, further comprising, upon the unused capacity of the first storage pool falling below the predetermined threshold value, deciding a capacity to be allocated from the second storage pools to the first storage pool, allocating the first storage region to the first storage pool according to the decided capacity, and allocating the first storage region to the first virtual volume.

8. The control method for a storage apparatus according to claim 6, further comprising deleting the data stored in the first storage region upon adding the at least one of the third storage regions to the first storage pool.

9. The control method for a storage apparatus according to claim 6, further comprising, upon the unused capacity of the first storage pool falling below the predetermined threshold value, determining whether to allocate part of the unused capacity from the second storage pool to the first storage pool based on a pre-set first policy, and allocates a part of the unused capacity of from the second storage pool to the first storage pool when it determines that a part of the unused capacity should be allocated.

10. The control method for a storage apparatus according to claim 6, further comprising, upon the third plurality of storage devices being added to the storage apparatus, the controller determines whether to execute processing of copying data stored in the first storage region to at least one of the third plurality of storage regions and adding the at least one of the third plurality of storage regions to the first storage pool according to a pre-set second policy, and executes the processing upon determining that the processing should be executed.

* * * * *